US010989729B2

(12) United States Patent
Sato

(10) Patent No.: US 10,989,729 B2
(45) Date of Patent: Apr. 27, 2021

(54) PHYSICAL QUANTITY SENSOR DEVICE, AND INCLINOMETER, INERTIA MEASUREMENT DEVICE, STRUCTURE MONITORING DEVICE, AND MOVING OBJECT USING PHYSICAL QUANTITY SENSOR DEVICE

(71) Applicant: Seiko Epson Corporation, Tokyo (JP)

(72) Inventor: Kenta Sato, Shiojiri (JP)

(73) Assignee: Seiko Epson Corporation

( * ) Notice: Subject to any disclaimer, the term of this patent is extended or adjusted under 35 U.S.C. 154(b) by 234 days.

(21) Appl. No.: 16/296,326

(22) Filed: Mar. 8, 2019

(65) Prior Publication Data

US 2019/0277871 A1 Sep. 12, 2019

(30) Foreign Application Priority Data

Mar. 9, 2018 (JP) .............................. JP2018-043534

(51) Int. Cl.
*G01P 1/00* (2006.01)
*G01P 3/00* (2006.01)
*G01C 9/02* (2006.01)
G01C 19/5607 (2012.01)

(52) U.S. Cl.
CPC ................ *G01P 1/006* (2013.01); *G01C 9/02* (2013.01); *G01P 3/00* (2013.01); *G01C 19/5607* (2013.01)

(58) Field of Classification Search
CPC .......... G01P 15/18; G01P 1/006; G01P 1/023; G01P 2015/0871; G01P 21/00; G01P 3/00; G01C 19/5607; G01C 9/02
See application file for complete search history.

(56) References Cited

U.S. PATENT DOCUMENTS

| 4,563,748 | A | * | 1/1986 | Hanaoka | ................. | G01K 7/245 |
| | | | | | | 236/46 R |
| 5,231,880 | A | * | 8/1993 | Ward | .................... | G01L 9/0022 |
| | | | | | | 310/338 |
| 5,511,427 | A | * | 4/1996 | Burns | ................... | G01D 3/0365 |
| | | | | | | 374/118 |
| 2008/0202237 | A1 | * | 8/2008 | Hammerschmidt | .... | G01P 15/18 |
| | | | | | | 73/504.04 |
| 2018/0273374 | A1 | * | 9/2018 | Keal | ..................... | B81C 1/0023 |

FOREIGN PATENT DOCUMENTS

| JP | 06-021720 A | 1/1994 |
| JP | 06-347355 A | 12/1994 |
| JP | 2010-281581 A | 12/2010 |
| JP | 2014-085233 A | 5/2014 |
| JP | 2016-217902 A | 12/2016 |

* cited by examiner

*Primary Examiner* — Francis C Gray

(74) *Attorney, Agent, or Firm* — Harness, Dickey & Pierce, P.L.C.

(57) ABSTRACT

A physical quantity sensor device includes a physical quantity sensor and a storage. The storage stores a first constant used as a constant of each term in an approximate polynomial to obtain a first secondary frequency temperature characteristic approximated to the actual frequency temperature characteristic, in a first temperature region less than the first boundary temperature, and a second constant used as a constant of each term in the approximate polynomial to obtain a second secondary frequency temperature characteristic approximated to the actual frequency temperature characteristic, in a second temperature region equal to or greater than the first boundary temperature.

17 Claims, 14 Drawing Sheets

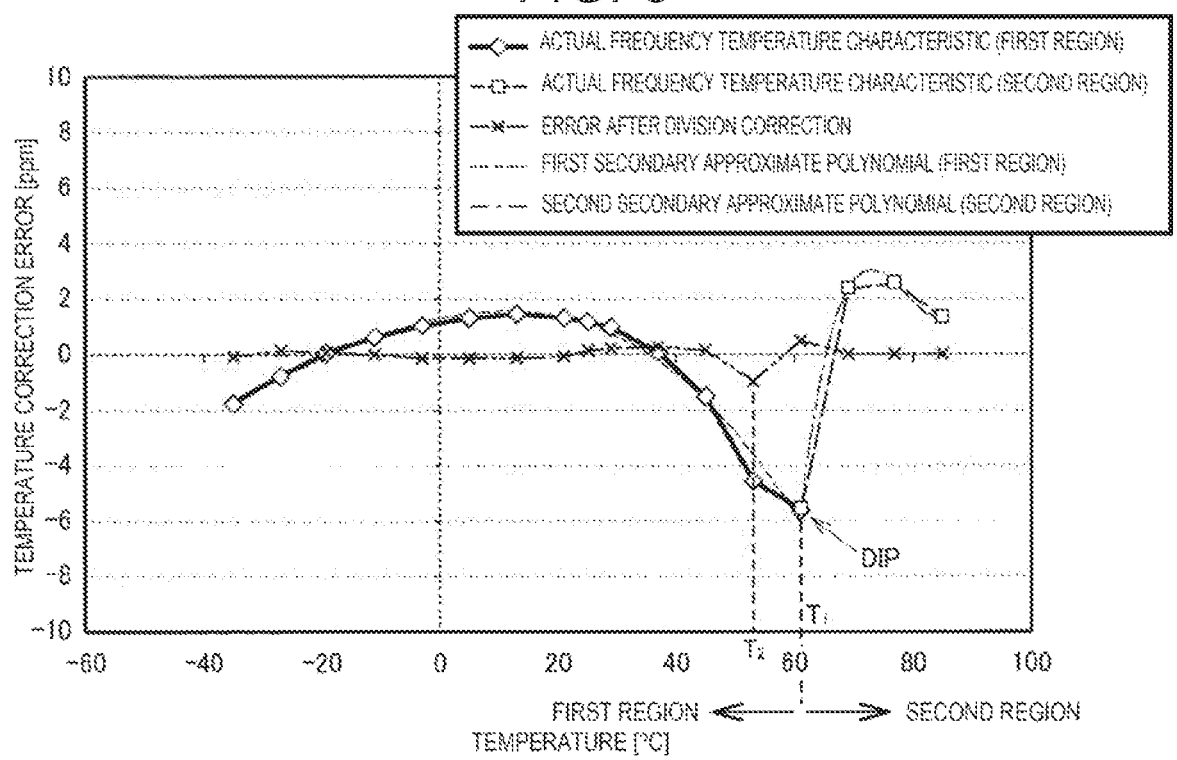
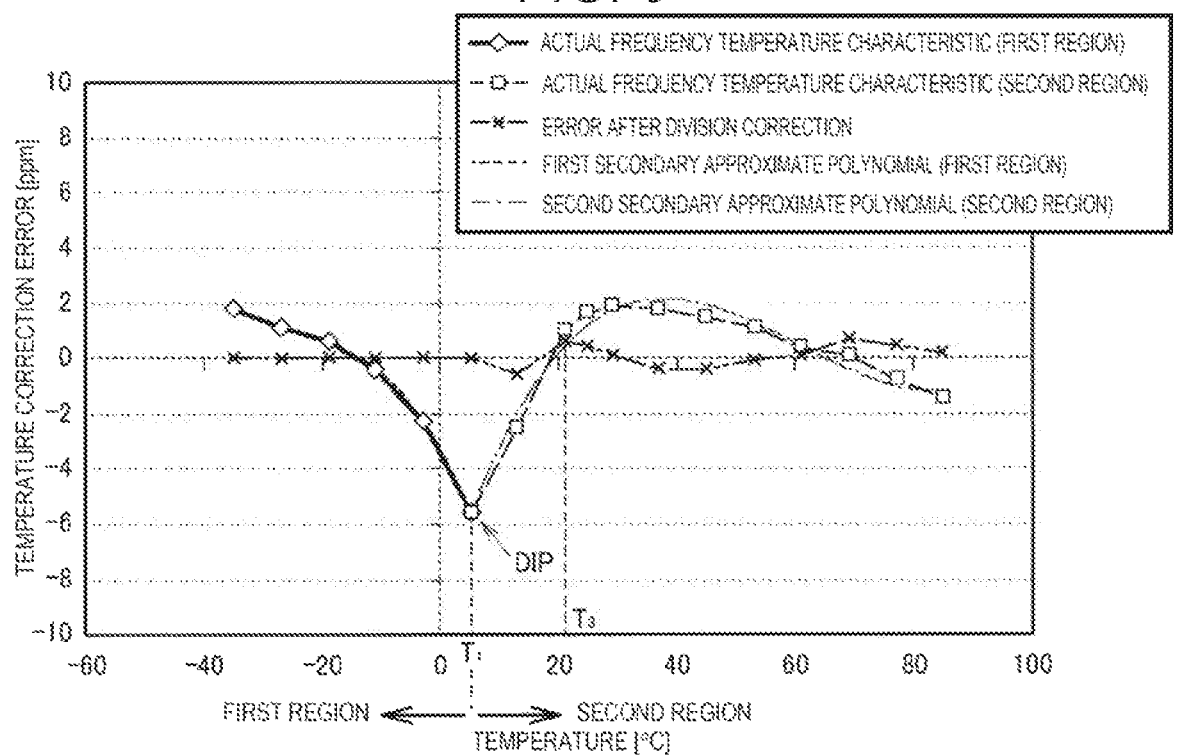

PHYSICAL QUANTITY SENSOR DEVICE, AND INCLINOMETER, INERTIA MEASUREMENT DEVICE, STRUCTURE MONITORING DEVICE, AND MOVING OBJECT USING PHYSICAL QUANTITY SENSOR DEVICE

BACKGROUND

1. Technical Field

The present invention relates to a physical quantity sensor device, and an inclinometer, an inertia measurement device, a structure monitoring device, a moving object, and the like using the physical quantity sensor device.

2. Related Art

In JP-A-2014-85233, an acceleration sensor using a Z-cut (Z' cut) quartz crystal board is described. The acceleration sensor includes a base, a movable portion connected to the base, a double-ended tuning fork resonator attached to the base and the movable portion, and a support portion connected to the base and provided in a region opposite to the base side.

In JP-A-2010-281581, an approximate polynomial related to a frequency temperature characteristic of the double-ended tuning fork resonator is described. In the double-ended tuning fork resonator having a secondary characteristic (quadratic curve) which is mounted on a sensor and whose the frequency temperature characteristic is upwardly protrusive, with respect to the frequency temperature characteristic in a state where stress is not applied to the double-ended tuning fork resonator, in view of a problem to be solved that the frequency temperature characteristic itself fluctuates in a state where stress is applied, high accuracy of a pressure value output by a pressure sensor is realized by correcting the frequency temperature characteristic using, for the approximate polynomials related to the frequency temperature characteristic of the double-ended tuning fork resonator, a polynomial representing the frequency temperature characteristic as a first approximate expression f:

$$f = a_1 \times T^3 + a_2 \times T^2 + a_3 \times T + a_4 \quad (1)$$

a polynomial representing a pressure frequency characteristic indicating a "pressure P-frequency f characteristic" indicating a change in a resonance frequency f when stress is applied as a second approximate expression P:

$$P = b_1 \times f^3 + b_2 \times f^2 + b_3 \times f + fc \quad (2),\text{ and}$$

a first-order coefficient $b_3$ in the expression (2), which is a coefficient representing temperature dependence, as a third approximate expression $b_3$:

$$b_3 = c_1 \times T^2 + c_2 \times T + c_3 \quad (3).$$

However, in recent years, demands for higher accuracy and higher sensitivity of the acceleration sensor are increasing, and further improvement of the frequency temperature characteristic is becoming necessary. That is, a so-called dip (DIP) in which the frequency temperature characteristic locally decreases (drops) is generated by combining a resonance frequency of the double-ended tuning fork resonator with a resonance frequency related to a structure of a physical quantity sensor. There is a new problem that the approximate polynomial described in JP-A-2014-85233 and JP-A-2010-281581 described above cannot fully compensate for the dip.

SUMMARY

An advantage of some aspects of the invention is to provide a physical quantity sensor device capable of obtaining accuracy equivalent to a frequency temperature characteristic in which a dip does not occur even while using a single approximate polynomial, even if a so-called dip in which the frequency temperature characteristic locally decreases (drops) is generated, and an inclinometer, an inertia measurement device, a structure monitoring device, and a moving object using the physical quantity sensor device.

(1) An aspect of the invention relates to a physical quantity sensor device which includes a physical quantity sensor, and a storage, and in which the storage stores, when a temperature at which an absolute value of an error between an actual frequency temperature characteristic measured by using the physical quantity sensor and a primary frequency temperature characteristic approximated to the actual frequency temperature characteristic over an entire operating temperature range by a single approximate polynomial using a predetermined constant becomes a maximum value is set as a first boundary temperature, a first constant used as a constant of each term in the approximate polynomial to obtain a first secondary frequency temperature characteristic approximated to the actual frequency temperature characteristic, in a first temperature region less than the first boundary temperature, and a second constant used as a constant of each term in the approximate polynomial to obtain a second secondary frequency temperature characteristic approximated to the actual frequency temperature characteristic, in a second temperature range equal to or greater than the first boundary temperature.

(2) In the physical quantity sensor device according to the aspect (1) of the invention, the maximum value may be actual data obtained for a plurality of temperatures in the entire operating temperature range of any one of the actual frequency temperature characteristics created based on the actual data.

(3) In the physical quantity sensor device according to the aspect (1) of the invention, the maximum value may be a value interpolated between two pieces of actual data among the actual frequency temperature characteristics created based on actual data obtained for a plurality of temperatures in the entire operation temperature range.

(4) In the physical quantity sensor device according to the aspect (1) of the invention, the storage may store, instead of the first constant, when a temperature at which the error between the actual frequency temperature characteristic and the primary frequency temperature characteristic becomes a maximum value or a minimum value is set as a second boundary temperature in the first temperature region, a third constant used as a constant of each term in the approximate polynomial to obtain a third secondary frequency temperature characteristic approximated to the actual frequency temperature characteristic, in a third temperature region less than the second boundary temperature, and a fourth constant used as a constant of each term in the approximate polynomial to obtain a fourth secondary frequency temperature characteristic approximated to the actual frequency temperature characteristic, in a fourth temperature region equal to or greater than the second boundary temperature and less than the first boundary temperature.

(5) In the physical quantity sensor device according to the aspect (1) of the invention, the storage may store, instead of the second constant, when a temperature at which the error between the actual frequency temperature characteristic and the primary frequency temperature characteristic becomes a maximum value or a minimum value is set as a third boundary temperature in the second temperature region, a fifth constant used as a constant of each term in the approximate polynomial to obtain a fifth secondary frequency temperature characteristic approximated to the actual frequency temperature characteristic, in a fifth temperature region equal to or greater than the first boundary temperature and less than the third boundary temperature, and a sixth constant used as a constant of each term in the approximate polynomial to obtain a sixth secondary frequency temperature characteristic approximated to the actual frequency temperature characteristic, in a sixth temperature region equal to or greater than the third boundary temperature.

(6) In the physical quantity sensor device according to the aspect (1) of the invention, the actual frequency temperature characteristic may include a dip in which a frequency locally decreases at the first boundary temperature.

(7) In the physical quantity sensor device according to the aspect (5) of the invention, the actual frequency temperature characteristic may include a first dip locally decreasing at the first boundary temperature, and a second dip locally decreasing at the second boundary temperature or the third boundary temperature.

(8) In the physical quantity sensor device according to the aspect (1) of the invention, the storage may store, instead of the first constant, when a temperature at which the error between the actual frequency temperature characteristic and the first secondary frequency temperature characteristic becomes a maximum value or a minimum value is set as a second boundary temperature in the first temperature region, a third constant used as a constant of each term in the approximate polynomial to obtain a first tertiary frequency temperature characteristic that minimizes an absolute value of the error between the actual frequency temperature characteristic and the first secondary frequency temperature characteristic in a third temperature region less than the second boundary temperature, and a fourth constant used as a constant of each term in the approximate polynomial to obtain a second tertiary frequency temperature characteristic that minimizes an absolute value of the error between the actual frequency temperature characteristic and the second secondary frequency temperature characteristic in a fourth temperature region equal to or greater than the second boundary temperature and less than the first boundary temperature.

(9) In the physical quantity sensor device according to the aspect (1) of the invention, the storage may store, instead of the second constant, when a temperature at which the error between the actual frequency temperature characteristic and the second secondary frequency temperature characteristic becomes a maximum value or a minimum value is set as a third boundary temperature in the second temperature region, a fifth constant used as a constant of each term in the approximate polynomial to obtain a third tertiary frequency temperature characteristic that minimizes an absolute value of the error between the actual frequency temperature characteristic and the second secondary frequency temperature characteristic in a fifth temperature region equal to or greater than the first boundary temperature and less than the third boundary temperature, and a sixth constant used as a constant of each term in the approximate polynomial to obtain a fourth tertiary frequency temperature characteristic that minimizes an absolute value of the error between the actual frequency temperature characteristic and the second secondary frequency temperature characteristic in a sixth temperature region equal to or greater than the third boundary temperature.

(10) In the physical quantity sensor device according to the aspect (1) of the invention, the first constant and the second constant may differ from each other in at least one of (N+1) constants when the single approximate polynomial is an N-th order polynomial (N is an integer of 2 or more).

(11) In the physical quantity sensor device according to the aspect (1) of the invention, a circuit board is provided, three physical quantity sensors are provided, and the three physical quantity sensors may be mounted on the circuit board so that each of detection axes of the three physical quantity sensors is aligned with each of three axes orthogonal to each other.

(12) In the physical quantity sensor device according to the aspect (1) of the invention, the physical quantity sensor includes a base, a movable portion, a constricted portion that is disposed between the base and the movable portion and connects the base and the movable portion, and a physical quantity detection element that has a resonance frequency that changes according to stress, is disposed across the constricted portion in a plan view, and is attached to the base and the movable portion.

(13) In the physical quantity sensor device according to the aspect (1) of the invention, the physical quantity may be acceleration.

(14) Another aspect of the invention relates to an inclinometer which includes the physical quantity sensor device according to (13), and a calculator that calculates an inclination angle of a structure based on an output signal from the physical quantity sensor device attached to the structure.

(15) Still another aspect of the invention relates to an inertia measurement device which includes the physical quantity sensor device according to (13), an angular velocity sensor device, and a circuit for calculating an attitude of a moving object based on an acceleration signal from the physical quantity sensor device and an angular velocity signal from the angular velocity sensor device.

(16) Still another aspect of the invention relates to a structure monitoring device which includes the physical quantity sensor device according to (13), a receiver that receives a detection signal from the physical quantity sensor device attached to a structure, and a calculator that calculates an inclination angle of the structure based on a signal output from the receiver.

(17) Still another aspect of the invention relates to a moving object which includes the physical quantity sensor device according to (13), and a controller that controls at least one of acceleration, braking, and steering based on a detection signal detected by the physical quantity sensor device, and in which execution or non-execution of an automatic operation is switched according to a change in a detection signal from the physical quantity sensor device.

BRIEF DESCRIPTION OF THE DRAWINGS

The invention will be described with reference to the accompanying drawings, wherein like numbers reference like elements.

FIG. 8 is a characteristic diagram illustrating that the error between the actual frequency temperature characteristic and the secondary frequency temperature characteristic is reduced by the method illustrated in FIG. 7.

FIG. 9 is a characteristic diagram illustrating that the error between the actual frequency temperature characteristic and the secondary frequency temperature characteristic is reduced in a physical quantity sensor device different from that in FIG. 8.

DESCRIPTION OF EXEMPLARY EMBODIMENTS

Hereinafter, preferred embodiments of the invention will be described in detail. This embodiment described below does not unduly limit contents of the invention described in the appended claims, and not all of the configurations described in the embodiment are necessarily indispensable as solution means of the invention.

1. Overview of Physical Quantity Sensor and Physical Quantity Sensor Device

Figure 2:
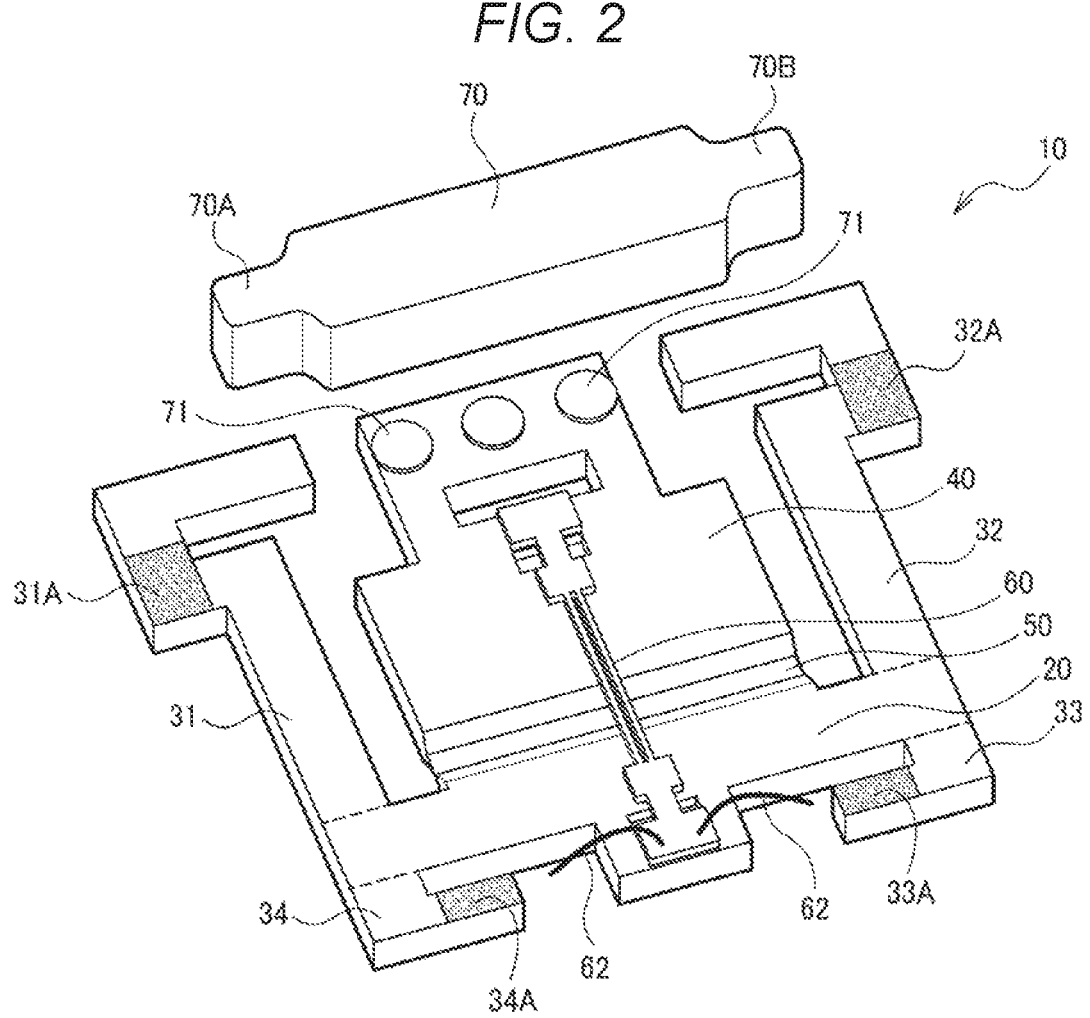
FIG. 2 is a perspective view of a physical quantity sensor used in the physical quantity sensor device according to the embodiment of the invention.

FIG. 2 illustrates a physical quantity sensor 10. The physical quantity sensor 10 includes a base 20, at least two, for example three, of a first arm portion 31, a second arm portion 32, a third arm portion 33, and a fourth arm portion 34, and a movable portion 40, a constricted portion 50, and a physical quantity detection element 60.

Figure 1:
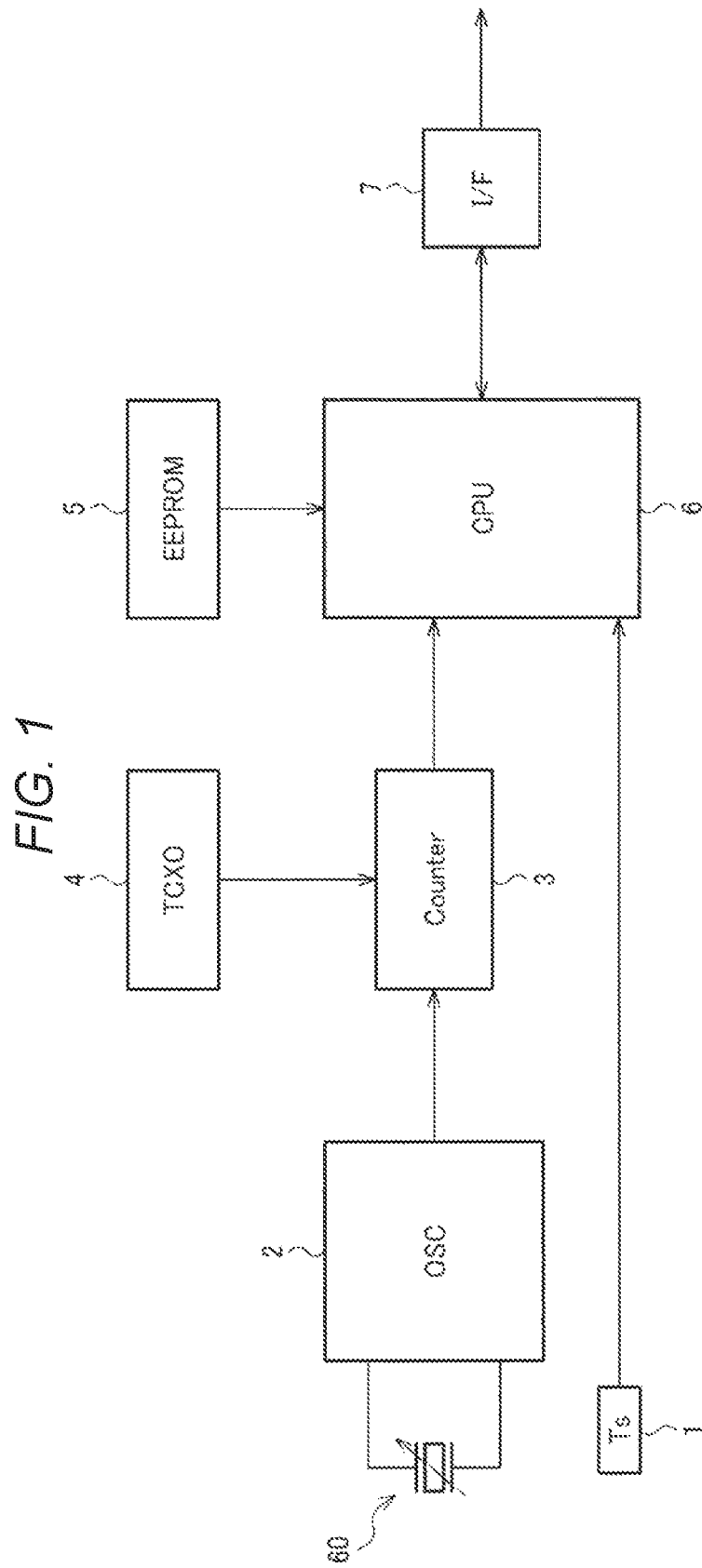
FIG. 1 is an electrical system block diagram of a physical quantity sensor device according to an embodiment of the invention.

The first arm portion 31, the second arm portion 32, the third arm portion 33, and the fourth arm portion 34 have proximal end portions connected to the base 20, and preferably, a fixed region 31A, a fixed region 32A, a fixed region 33A, and a fixed region 34A are provided on free end sides, respectively. The constricted portion 50 is disposed between the base 20 and the movable portion 40, and connects the base 20 and the movable portion 30. The physical quantity detection element 60 is constituted by, for example, a double-ended tuning fork type quartz crystal resonator, and detects, for example, acceleration and pressure as a physical quantity. The physical quantity detection element 60 is disposed across the constricted portion 50 in a plan view when seen in the thickness direction of the base 20 and is attached to the base 20 and the movable portion 40 through a joining portion 61 (see FIG. 3) such as an adhesive. On the free end side of the movable portion 40 which is a cantilever with the constricted portion 50 as a fulcrum, a weight (mass portion) 70 made of, for example, metal (SUS, copper, and the like) can be disposed. As illustrated in FIG. 2, the weight 70 is not limited to being provided on the front surface side of the movable portion 40, but can also be provided on the back surface side of the movable portion 40 (see FIG. 3). As illustrated in FIG. 1 and FIG. 2, the weight 70 is attached to the movable portion 40 by a joining portion 71 such as an adhesive. Although the weight 70 illustrated in FIG. 2 moves up and down together with the movable portion 40, both end portions 70A and 70B of the weight 70 function as stoppers for preventing excessive amplitude by coming into contact with the arm portion 31 and the arm portion 32 illustrated in FIG. 2.

Figure 3:
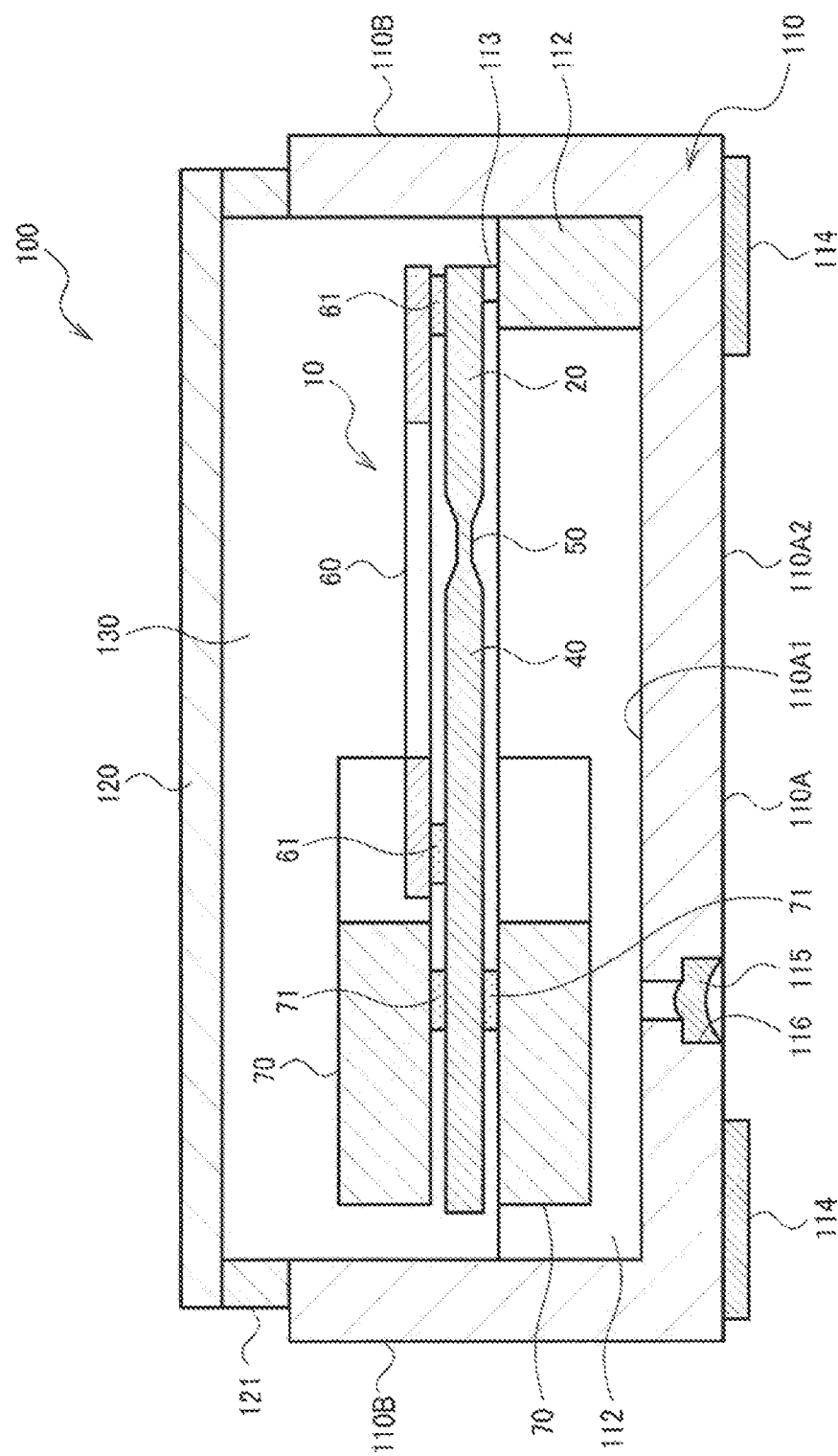
FIG. 3 is a perspective view of a uniaxial physical quantity sensor device according to the embodiment of the invention.

The first arm portion 31, the second arm portion 32, the third arm portion 33, and the fourth arm portion 34 have proximal end portions connected to the base 20, and preferably, a fixed region 31A, a fixed region 32A, a fixed region 33A, and a fixed region 34A are provided on free end sides, respectively. The constricted portion 50 is disposed between the base 20 and the movable portion 40, and connects the base 20 and the movable portion 30. The physical quantity detection element 60 is constituted by, for example, a double-ended tuning fork type quartz crystal resonator, and detects, for example, acceleration and pressure as a physical quantity. The physical quantity detection element 60 is disposed across the constricted portion 50 in a plan view when seen in the thickness direction of the base 20 and is connected to the base 20 and the movable portion 40 by the joining portion 61 (see FIG. 3) such as an adhesive. On the free end side of the movable portion 40 which is a cantilever with the constricted portion 50 as a fulcrum, a weight (mass portion) 70 made of, for example, metal (SUS, copper, and the like) can be disposed. As illustrated in FIG. 2, the weight 70 is not limited to being provided on the front surface side of the movable portion 40, but can also be provided on the back surface side of the movable portion 40 (see FIG. 3). As illustrated in FIG. 2 and FIG. 3, the weight 70 is connected to the movable portion 40 by a joining portion 71 such as an adhesive. Although the weight 70 illustrated in FIG. 2 moves up and down together with the movable portion 40, both end portions 70A and 70B of the weight 70 function as stoppers for preventing excessive amplitude by coming into contact with the arm portion 31 and the arm portion 32 illustrated in FIG. 2.

Here, stress is generated in the physical quantity detection element 60 attached to the base 20 and the movable portion 40 by displacing the movable portion 14 with the constricted portion 50 as a fulcrum according to the physical quantities such as acceleration and pressure. A vibration frequency (resonance frequency) of the physical quantity detection element 60 changes according to the stress applied to the physical quantity detection element 60. Based on the change in the vibration frequency, the physical quantity can be detected.

FIG. 3 is a cross-sectional view illustrating a physical quantity sensor device 100 in which the physical quantity sensor 10 of FIG. 2 is incorporated. The physical quantity sensor device 100 includes a base 110 on which the physical quantity sensor 10 is mounted. In this embodiment, the base 110 is configured as a package base including a bottom wall 110A and side walls 110B. The base 110, together with a lid 120, forms a package for accommodating the physical quantity sensor 10. The lid 120 is joined to an opening end of the base 110 through an adhesive 121.

On the bottom wall 110A of the base 110, a step portion 112 one step higher than an inner surface 110A1 of the bottom wall 110A is provided along, for example, three side walls 110B of four side walls 110B. The step portion 112 may protrude from the inner surface of the side wall 110B or may be integral with or separate from the base 110, but is a part constituting the base 110. As illustrated in FIG. 3, the physical quantity sensor 10 is fixed to the step portion 112 with an adhesive 113. Here, as the adhesive 113, it is preferable to use a resin-based (for example, epoxy resin) adhesive having a high elastic modulus. Since an adhesive such as low melting point glass is hard, the adhesive cannot absorb stress distortion generated at the time of joining and adversely affects the physical quantity detection element 60. The positions of the fixed region 31A, the fixed region 32A, the fixed region 33A, and the fixed region 34A when seen in a plan view in which the first arm portion 31, the second arm portion 32, the third arm portion 33, and the fourth arm portion 34 provided in the physical quantity sensor 10 are fixed to the step portion 112 are illustrated in FIG. 2.

In this embodiment, as illustrated in FIG. 2, the physical quantity detection element 60 can be connected to electrodes (for example, gold electrodes) formed in the step portion 112 by bonding wires 62 and 62. In this case, it is unnecessary to form an electrode pattern on the base 20. The electrode pattern provided also on the base 20 may be connected to the electrodes formed on the step portion 112 of the base 110 through a conductive adhesive without adopting the bonding wires 62 and 62.

Figure 4:
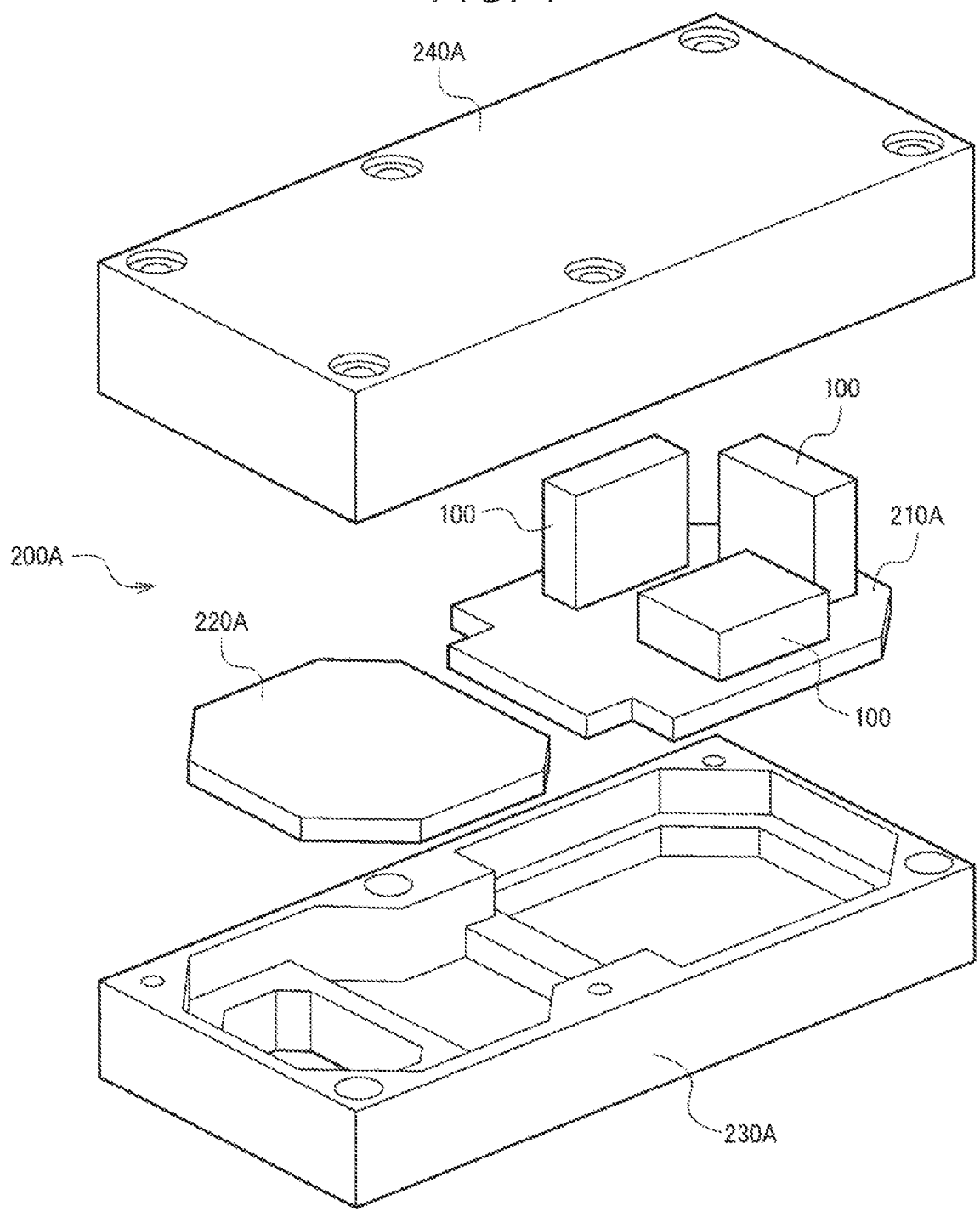
FIG. 4 is a perspective view of a triaxial physical quantity sensor device according to the embodiment of the invention.

On the outer surface (surface opposite to the inner surface 110A1) 110A2 of the bottom wall 110A of the base 110, an external terminal 114 used for mounting an element on an electronic circuit board 210A illustrated in FIG. 4 is provided. The external terminal 114 is electrically connected to the physical quantity detection element 60 through a wiring, an electrode, or the like (not illustrated).

For example, a sealing portion 115 for sealing the inside (cavity) 130 of a package formed by the base 110 and the lid 120 is provided on the bottom wall 110A. The sealing portion 115 is provided in a through-hole 116 formed in the base 110. The sealing portion 115 is provided by disposing a sealing material in the through-hole 116, heating and melting the sealing material, and solidifying the sealing material. The sealing portion 115 is provided to hermetically seal the inside of the package.

FIG. 4 is an exploded perspective view of a triaxial physical quantity sensor device 200A including three uniaxial physical quantity sensor devices 100. In FIG. 4, three physical quantity sensor devices 100 are mounted on the electronic circuit board 210A. In the three physical quantity sensor devices 100, detection axes are provided along three orthogonal axes to detect physical quantities of the three axes. The electronic circuit board 210A is electrically connected to a connector board 220A. The electronic circuit board 210A and the connector board 220A are accommodated and held in a package formed by a package base 230A and a lid 240A.

Figure 5:
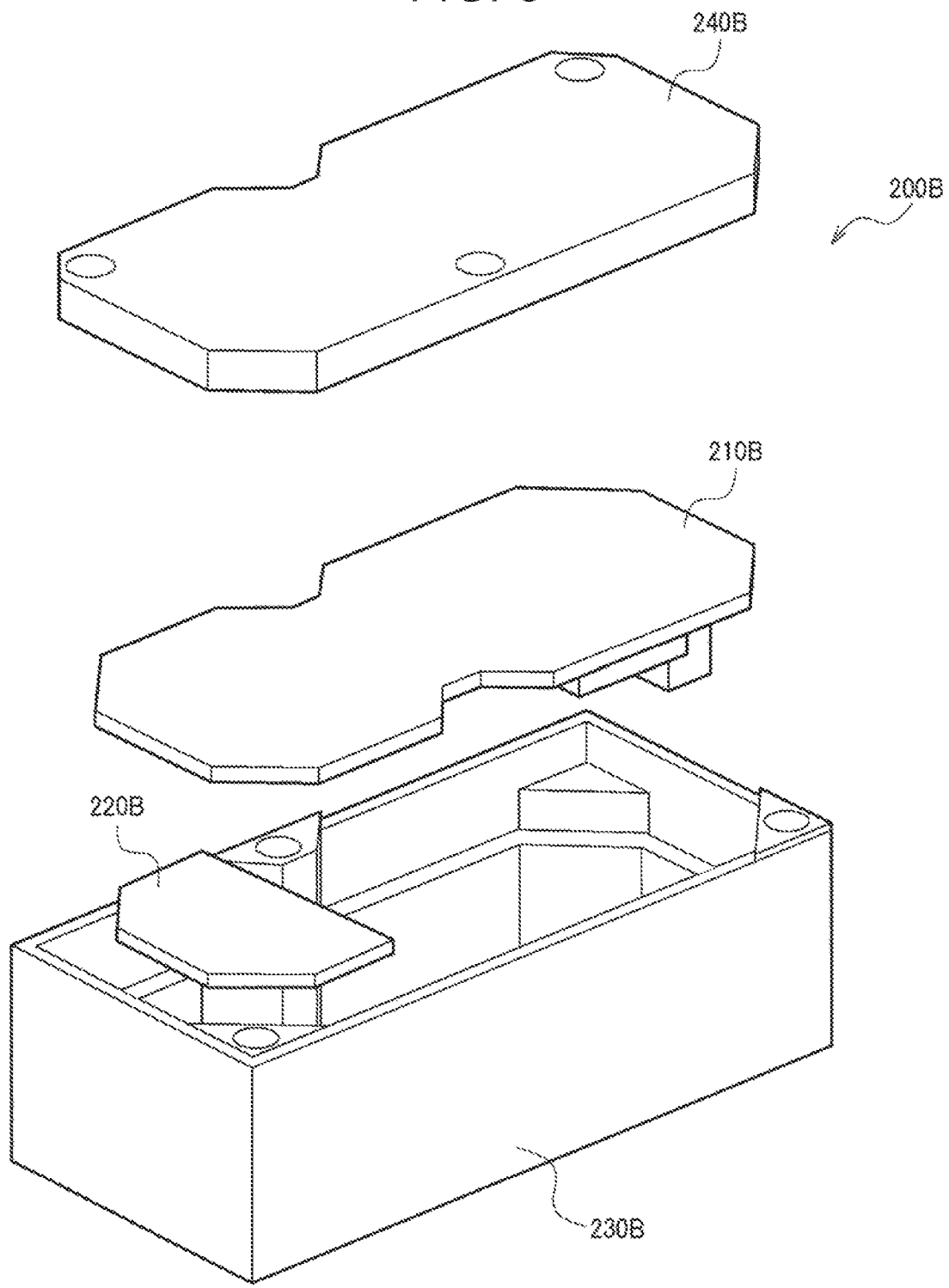
FIG. 5 is a perspective view illustrating another example of the triaxial physical quantity sensor device according to the embodiment of the invention.

FIG. 5 illustrates a triaxial physical quantity sensor device 200B which is different from that illustrated in FIG. 4. In FIG. 4, the electronic circuit board 210A and the connector board 220A are juxtaposed on the same plane, but in FIG. 5, the electronic circuit board 210A and the connector board 220A are juxtaposed in the vertical direction. Also in FIG. 5, a circuit board 210B and a connector board 220B are accommodated and held in a package formed by a package base 230B and a lid 240B.

2. Compensation of Frequency Temperature Characteristic of Physical Quantity Sensor Device.

2.1. Configuration for Compensation of Frequency Temperature Characteristic

FIG. 1 is an electrical block diagram of a uniaxial physical quantity sensor device according to an embodiment of the present invention. The physical quantity sensor device includes the following components, in addition to the physical quantity detection element 60 whose frequency changes according to the physical quantity, for example, acceleration or pressure. A temperature sensor (Ts) 1 senses temperature of the physical quantity detection element 60 and outputs a temperature signal. An oscillation circuit (OSC) 2 excites the physical quantity detection element 60. A counter 3 counts the output signal of the oscillation circuit 2. A temperature compensated reference oscillator (TCXO) 4 supplies a reference signal to the counter 3. The storage 5 such as an EEPROM stores each constant in a case where the temperature characteristic of the physical quantity detection element 60 is approximated by a single polynomial. An operation processing unit (CPU) 6 performs an operation using a temperature signal of the temperature sensor 1, a frequency signal of the counter 3, and a constant from the storage 5. An interface (I/F) 7 electrically connects the operation processing unit 6 and an external device.

In a case of using the physical quantity sensor 10 in an environment with temperature change, firstly, a temperature signal is received from the temperature sensor 1 to calculate temperature. Next, constants of an approximate polynomial representing the frequency temperature characteristic (temperature T-frequency deviation $\Delta f/f$ characteristic) of the physical quantity sensor 10 stored in the storage 5 are read out, an approximate polynomial of the frequency temperature characteristic (temperature T-frequency deviation $\Delta f/f$) is generated by the operation processing unit 6, and temperature is applied to the approximate polynomial to compute frequency fluctuation of the physical quantity sensor 10 due to the temperature change. The operation processing unit 6 compensates the frequency of the physical quantity sensor 10 by using the frequency fluctuation and applies the compensated frequency change to the polynomial of an acceleration-frequency f generated by the operation processing unit 6, thereby obtaining acceleration applied to the physical quantity sensor 10.

2.2. Where the Problem is

Figure 6:
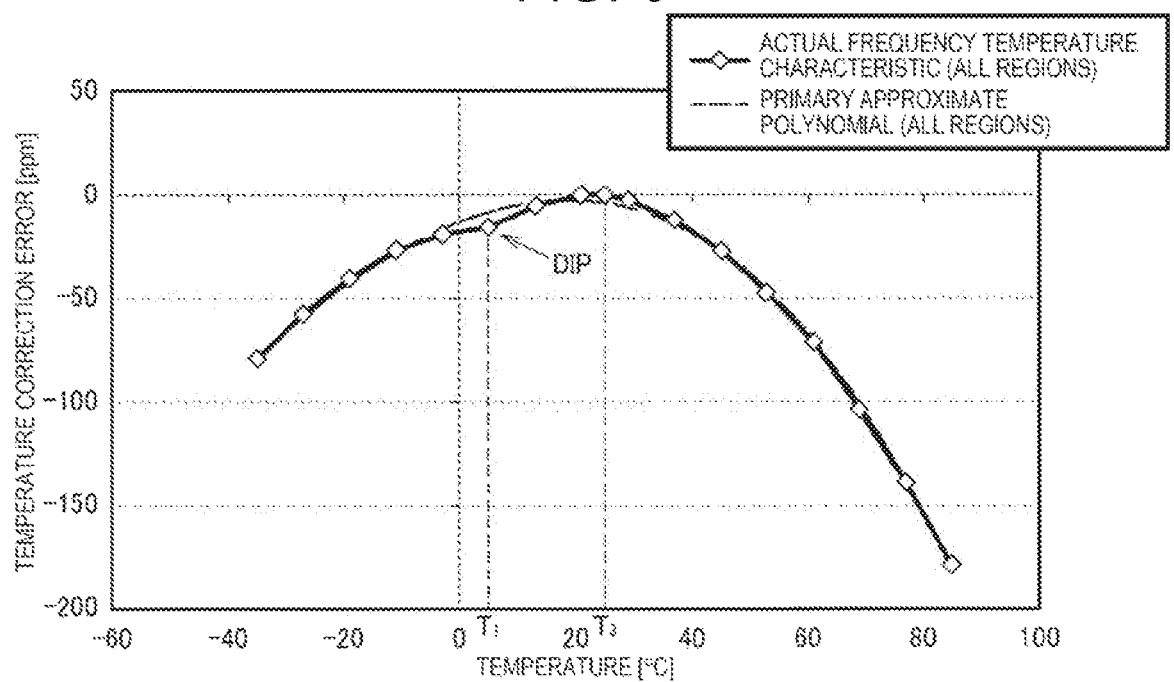
FIG. 6 is a characteristic diagram illustrating an error between an actual frequency temperature characteristic based on an output from a physical quantity sensor and a primary frequency temperature characteristic approximated to the actual frequency temperature characteristic.

In FIG. 6, under the condition that the same acceleration acts on the physical quantity detection element 60 excited at the oscillation frequency f from the oscillation circuit 2, data (white void squares) of the frequency number change $\Delta f/f$ obtained based on the output from the physical quantity detection element 60 by changing the temperature over the entire operating temperature range is plotted. In FIG. 6, the horizontal axis represents temperature and the vertical axis represents an error of temperature dependency when the frequency change Δf/f obtained at the peak temperature (around 25° C.) is an error 0. In the frequency change Δf/f illustrated in FIG. 6, a dip (DIP) in which the frequency temperature characteristic is locally lowered occurs. The cause of occurrence of this dip is affected by the resonance frequency of a structure of the physical quantity sensor device 100. For the sake of convenience, although the virtually approximated discrete data with the thick curve is illustrated as the actual frequency temperature characteristic, but actually, a collection of discrete data is the actual frequency temperature characteristic. Although it is ideal if it is possible to correct the temperature dependency of frequency change Δf/f according to this actual frequency temperature characteristic, in reality the approximate polynomial is used as follows.

The broken line illustrated in FIG. 6 is a curve of a single approximate polynomial approximated to the actual frequency temperature characteristic (thick line) by, for example, the least squares method or the like. This single approximate polynomial is expressed by, for example, N-th order (N is an integer equal to or greater than 2) approximate polynomial, and in the case of a tertiary approximate polynomial in which N=3, for example, when it is assumed that temperature is T and the constants of each term are $a_1$, $b_1$, $c_1$, and $d_1$, the frequency temperature characteristic is expressed by the following expression (4).

$$f_1(T) = a_1 \times T_3 + b_1 \times T_2 + c_1 \times T + d_1 \quad (4)$$

When it is assumed that a measured frequency is F, a frequency Fc after temperature correction is:

$$Fc = F - f_1(T) \quad (5).$$

The broken line in FIG. 6 illustrates the frequency temperature characteristic of the expression (4), and in this embodiment, the expression (4) is referred to as primary frequency temperature characteristic.

Here, as illustrated in FIG. 6, the primary frequency temperature characteristic (broken line) and the actual frequency temperature characteristic (thick line) almost overlap in many regions of the entire operating temperature range. However, an error occurs between the actual frequency temperature characteristic (thick character) and the primary frequency temperature characteristic (broken line), especially at a portion where the dip occurs in the actual frequency temperature characteristic (thick line). That is, it is impossible to fit over the entire operating temperature range with the single approximate polynomial illustrated in the expression (4) for the actual frequency temperature characteristic (thick line) which becomes discontinuous or nonlinear due to the occurrence of dip. Accordingly, under the temperature condition in the vicinity of temperature $T_1$ at which the dip occurs particularly, the detected physical quantity such as acceleration and the like still have temperature dependency, and accuracy deteriorates.

2.3. Compensation of Frequency Temperature Characteristic (this Embodiment)

Figure 7:
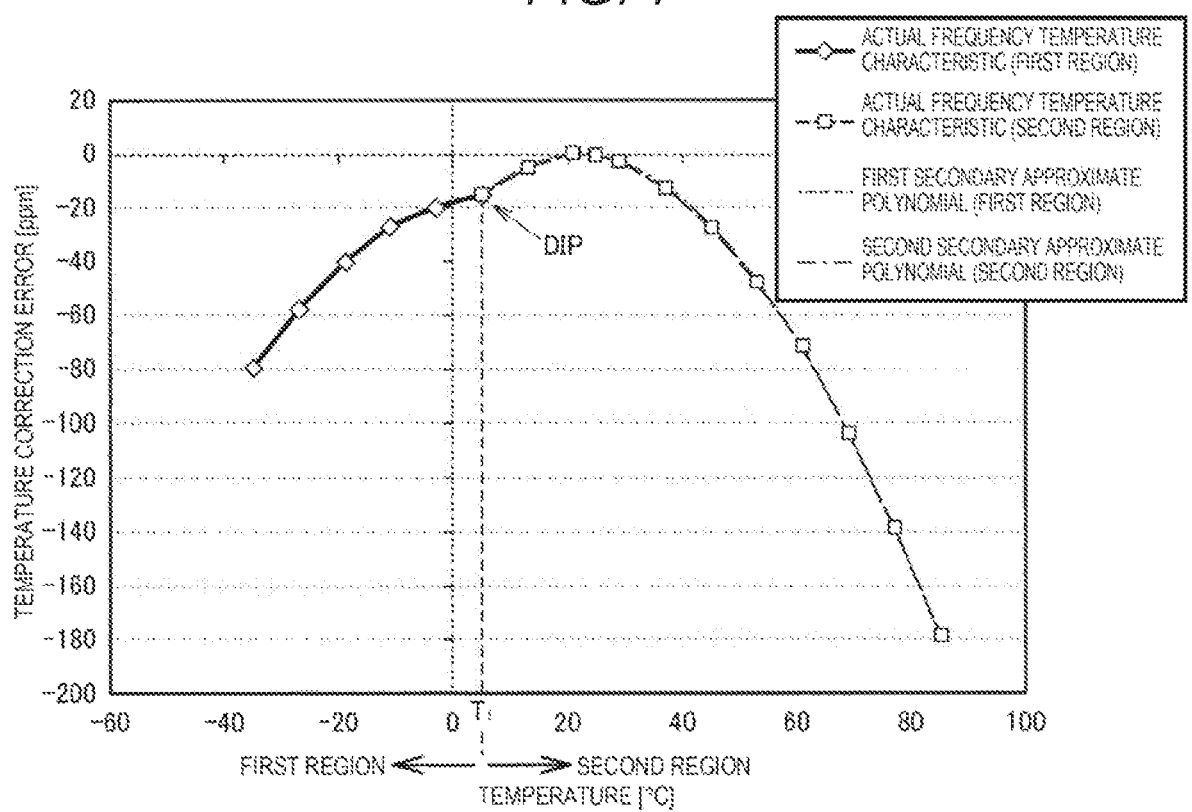
FIG. 7 is a characteristic diagram illustrating first and second secondary frequency temperature characteristics constituted with mutually different constants in first and second regions bordering a first boundary temperature.

Accordingly, attention was paid to the temperature $T_1$ at which an absolute value of the error between the actual frequency temperature characteristic (thick line) and the primary frequency temperature characteristic (broken line) in FIG. 6 becomes the maximum. The temperature $T_1$ is referred to as first boundary temperature $T_1$. As illustrated in FIG. 7 where the same horizontal and vertical axes as those in FIG. 6 are defined, a temperature region less than the first boundary temperature $T_1$ among the entire operating temperature range is referred to as a first temperature region (hereinafter, also referred to as a first region), and a temperature region equal to or greater than the first boundary temperature $T_1$ is referred to as a second temperature region (hereinafter, also referred to as a second region). Unlike the matters described above, the first boundary temperature $T_1$ may be included in the first region, and the first boundary temperature $T_1$ may be excluded from the second region.

The operation processing unit 6 illustrated in FIG. 1 uses an approximate polynomial of the following expression (6) obtained by replacing a constant ($a_1$, $b_1$, $c_1$, $d_1$) of each term in the approximate polynomial of the expression (4) with a first constant ($a_{21}$, $b_{21}$, $c_{21}$, $d_{21}$) in order to obtain a first secondary frequency temperature characteristic (short broken line in FIG. 7) approximated to the actual frequency temperature characteristic (thick line in FIG. 7), for example, by a least squares method or the like, in a first temperature region less than the first boundary temperature $T_1$.

$$f_{11}(T) = a_{21} \times T_3 + b_{21} \times T_2 + c_{21} \times T + d_{21} \quad (6)$$

Similarly, the operation processing unit 6 illustrated in FIG. 1 uses an approximate polynomial of the following expression (7) obtained by replacing the constant ($a_1$, $b_1$, $c_1$, $d_1$) of each term in the approximate polynomial of the expression (4) with a second constant ($a_{22}$, $b_{22}$, $c_{22}$, $d_{22}$) in order to obtain a second secondary frequency temperature characteristic (one-dot chain line in FIG. 7) approximated to the actual frequency temperature characteristic (long broken line in FIG. 7), for example, by a least squares method or the like, in a second temperature region equal to or greater than the first boundary temperature $T_1$.

$$f_{22}(T) = a_{22} \times T_3 + b_{22} \times T_2 + c_{22} \times T + d_{22} \quad (7)$$

Here, the first constant ($a_{21}$, $b_{21}$, $c_{21}$, $d_{21}$) and the second constant ($a_{22}$, $b_{22}$, $c_{22}$, $d_{22}$) are different. In addition, each of the first constant ($a_{21}$, $b_{21}$, $c_{21}$, $d_{21}$) and the second constant ($a_{22}$, $b_{22}$, $c_{22}$, $d_{22}$) is also different from the constant ($a_1$, $b_1$, $c_1$, $d_1$). In the present specification, the phrase of "constants are different" means that at least one of the (N+1) constants of the N-th order polynomial is different.

The first constant ($a_{21}$, $b_{21}$, $c_{21}$, $d_{21}$) and the second constant ($a_{22}$, $b_{22}$, $c_{22}$, $d_{22}$) are stored in the storage 5 of the physical quantity sensor device of this embodiment illustrated in FIG. 1, before factory shipment. On the other hand, the constants $a_1$, $b_1$, $c_1$, and $d_1$ of respective terms in the polynomial of expression (4) are not necessarily stored in the storage 5 of the physical quantity sensor device. The calculation (operation processing; computation) using the primary frequency temperature characteristic of the expression (4) is performed only before factory shipment. In a case of using the physical quantity sensor 10 of this embodiment, the temperature T is measured by the temperature sensor 1. Based on the result of comparing the measured temperature T with the first boundary temperature $T_1$, the operation processing unit 6 reads one of the first constant ($a_{21}$, $b_{21}$, $c_{21}$, $d_{21}$) and the second constant ($a_{22}$, $b_{22}$, $c_{22}$, $d_{22}$) from the storage 5. With this configuration, the operation processing unit 6 generates an approximate polynomial of the primary frequency temperature characteristic of the expression (6) or (7). The temperature T is applied to this primary frequency temperature characteristic so as to make it possible to calculate frequency fluctuation of the physical quantity sensor 10 due to temperature change.

Figure 10:
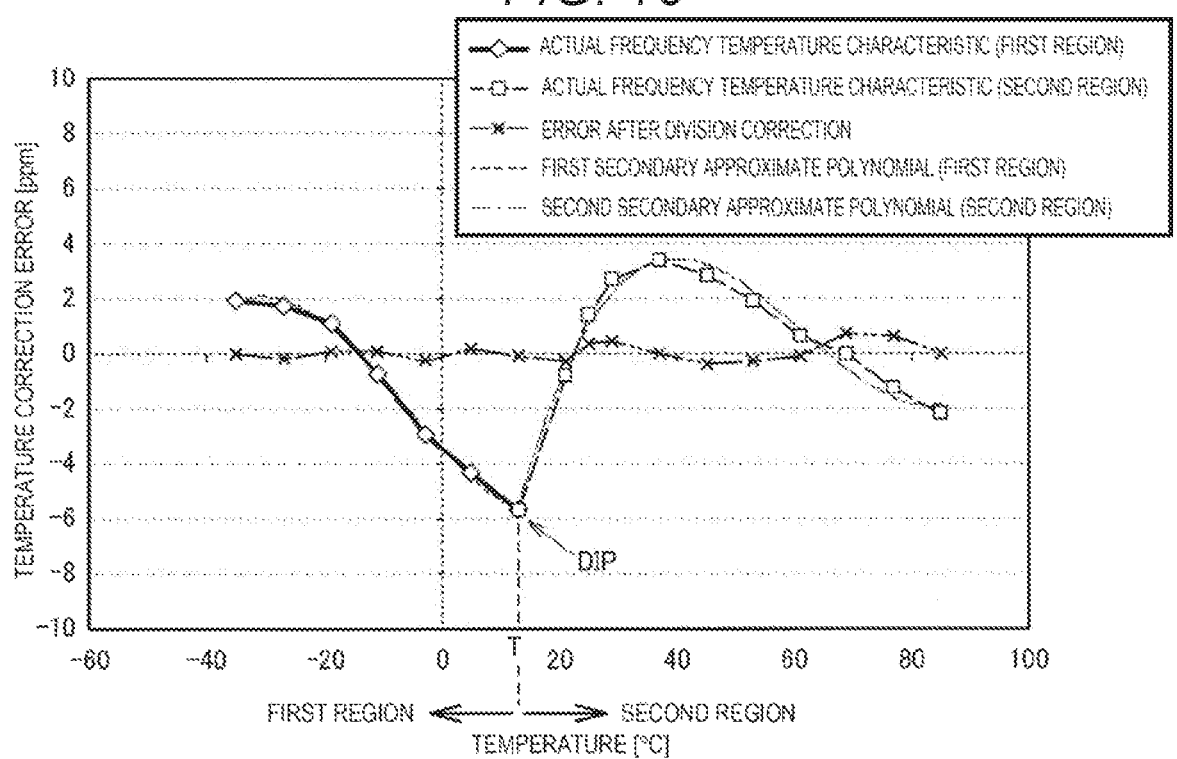
FIG. 10 is a characteristic diagram illustrating that the error between the actual frequency temperature characteristic and the secondary frequency temperature characteristic is reduced in a physical quantity sensor device different from those in FIGS. 8 and 9.

In FIGS. 8 to 10, different types of actual frequency temperature characteristics in which dips are generated in curves connecting actual data indicated by squares are illustrated. The actual frequency temperature characteristics illustrated in FIGS. 8 to 10 are characteristics of different physical quantity sensor devices. For each of the actual frequency temperature characteristics illustrated in FIG. 8 to FIG. 10, as illustrated in FIG. 6, the first boundary $T_1$ at which the absolute value of the error between the actual frequency temperature characteristic (thick line) and the primary frequency temperature characteristic (broken line) becomes the maximum is obtained. Then, with the first boundary temperature $T_1$ as a boundary, the first secondary frequency temperature characteristic indicated in the expression (6) applied to the first region and the second secondary frequency temperature characteristic indicated in the expression (7) applied to the second region are obtained. In this way, the first constant ($a_{21}$, $b_{21}$, $c_{21}$, $d_{21}$) and the second constant ($a_{22}$, $b_{22}$, $c_{22}$, $d_{22}$) specific to a device is stored in the storage 5 of each physical quantity sensor device.

In FIGS. 8 to 10, the meaning of 0 (zero) on the vertical axis of FIGS. 6 and 7 is different. In FIGS. 8 to 10, matters that a temperature correction error on the vertical axis is 0 (zero) indicate that it is the actual frequency temperature characteristic illustrated in FIG. 6. That is, if temperature dependency of the frequency change $\Delta f/f$ can be corrected according to the actual frequency temperature characteristic, the error is 0 (zero). White void square marks in the first region less than the boundary temperature $T_1$ illustrated in FIGS. 8 to 10 indicate errors between data (white void squares) on the actual frequency temperature characteristic and processed data obtained by allowing the data to be subjected to operation processing using the first secondary frequency temperature characteristic expressed in the expression (6), in the first region less than the first boundary temperature $T_1$. Similarly, white void square marks in the second region equal to or greater than the boundary temperature $T_1$ illustrated in FIGS. 8 to 10 indicate errors between data (white void squares) on the actual frequency temperature characteristic and processed data obtained by allowing the data to be subjected to operation processing using the second secondary frequency temperature characteristic expressed in the expression (7). As is apparent from FIGS. 8 to 10, it can be seen that the error in the entire operating temperature range is within ±1 ppm. That is, instead of the primary frequency temperature characteristic of the expression (4), the first secondary frequency temperature characteristic expressed in the expression (6) is used in the first region and the second secondary frequency temperature characteristic illustrated in the expression (7) is used in the second region, thereby capable of reducing the temperature dependency of the physical quantity such as measured acceleration and improving detection accuracy.

Figure 11:
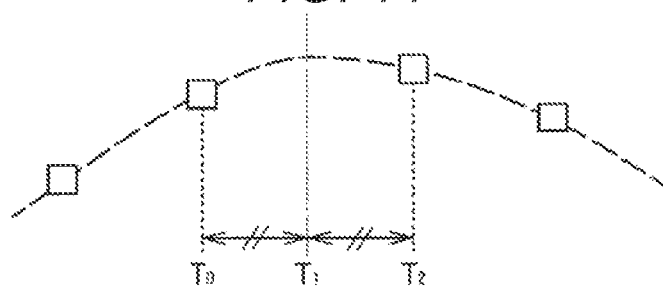
FIG. 11 is a diagram illustrating boundary temperatures obtained by interpolation from two pieces of actual data.

Here, the maximum values illustrated in FIGS. 6 to 10 are actual data of any one of actual frequency temperature characteristics created on the basis of actual data obtained for a plurality of temperatures within the entire operating temperature range. Alternatively, as illustrated in FIG. 11, the maximum value may be obtained at an interpolated position from two pieces of actual data. In this way, it can be estimated that it has the maximum value at the temperature $T_1$ between two temperatures $T_0$ and $T_2$ corresponding to the two pieces of actual data (corresponding to first and second magnitudes of an absolute value of an error) illustrated in FIG. 11.

3. Utilization of Plural Boundary Temperatures

Figure 12:
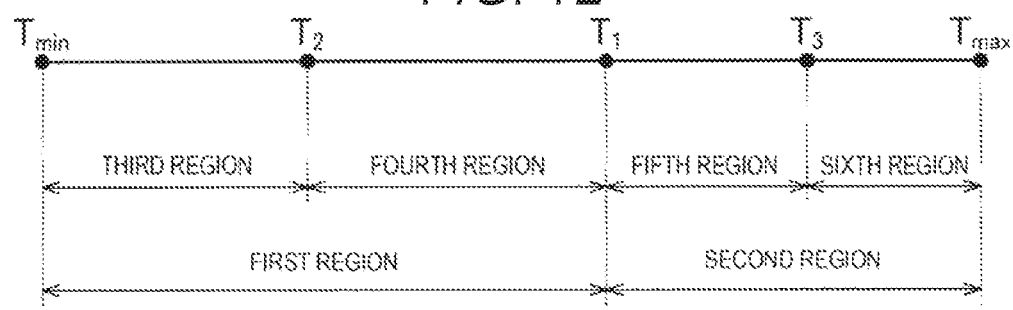
FIG. 12 is a diagram for explaining a third region to a sixth region divided by first to third boundary temperatures.

FIG. 12 illustrates a third temperature region (hereinafter, also referred to as a third region) and a fourth temperature region (hereinafter, also referred to as a fourth region) with the second boundary temperature $T_2$ in the first region as a boundary. FIG. 12 further illustrates a fifth temperature region (hereinafter, also referred to as a fifth region) and a sixth temperature region (hereinafter, also referred to as a sixth region) with the third boundary temperature $T_3$ in the second region as a boundary. In this way, a method of further subdividing the entire operating temperature range will be described.

3.1. Utilization of Three or More Secondary Frequency Temperature Characteristics In FIG. 6, the absolute value of the error becomes maximum at the first boundary temperature $T_1$, but the absolute value of the error is relatively large even at the temperature $T_3$ of the second region (see FIG. 7) equal to or greater than the first boundary temperature $T_1$. Therefore, although not illustrated, the error between the actual frequency temperature characteristic and the primary frequency temperature characteristic illustrated in FIG. 6 becomes the maximum value or the minimum value at the temperature $T_3$ in the second region. Similarly, although not illustrated in FIG. 6, the absolute value of the error may become relatively large even at the temperature $T_2$ (not illustrated in FIG. 6) of the first region (see FIG. 7) less than the first boundary temperature $T_1$. Therefore, although not illustrated, the error between the actual frequency temperature characteristic and the primary frequency temperature characteristic illustrated in FIG. 6 may become the maximum value or the minimum value at the temperature $T_2$ in the first region. Such a situation can occur even if no dip occurs at the temperature $T_3$, as illustrated in FIG. 6, but there is a high possibility especially when a dip occurs at the temperature $T_2$ or the temperature $T_3$.

In such a case, as illustrated in FIG. 12, the first region is divided into a third region and a fourth region at the second boundary temperature $T_2$. Then, in order to obtain a third secondary frequency temperature characteristic approximated to the actual frequency temperature characteristic of the third region, for example, by a least squares method or the like, an approximate polynomial of the following expression (8) obtained by replacing a constant ($a_1$, $b_1$, $c_1$, $d_1$) of each term in the approximate polynomial of the expression (4) with a third constant ($a_{23}$, $b_{23}$, $c_{23}$, $d_{23}$) is used.

$$f_{23}(T) = a_{23} \times T_3 + b_{23} \times T_2 + c_{23} \times T + d_{23} \quad (8)$$

Similarly, in order to obtain a fourth secondary frequency temperature characteristic approximated to the actual frequency temperature characteristic of the fourth region by, for example, the least squares method or the like, an approximate polynomial of the following expression (9) obtained by replacing the constant ($a_1$, $b_1$, $c_1$, $d_1$) of each term in the approximate polynomial of the expression (4) with a fourth constant ($a_{24}$, $b_{24}$, $c_{24}$, $d_{24}$) is used.

$$f_{24}(T) = a_{24} \times T_3 + b_{24} \times T_2 + c_{24} \times T + d_{24} \quad (9)$$

Here, the third constant ($a_{23}$, $b_{23}$, $c_{23}$, $d_{23}$) is different from the fourth constant ($a_{24}$, $b_{24}$, $c_{24}$, $d_{24}$). In addition, each of the third constant ($a_{23}$, $b_{23}$, $c_{23}$, $d_{23}$) and the fourth constant ($a_{24}$, $b_{24}$, $c_{24}$, $d_{24}$) is also different from the constant ($a_1$, $b_1$, $c_1$, $d_1$), the first constant ($a_{11}$, $b_{11}$, $c_{11}$, $d_{11}$), and the second constant ($a_{12}$, $b_{12}$, $c_{12}$, $d_{12}$).

The third constant ($a_{23}$, $b_{23}$, $c_{23}$, $d_{23}$) and the fourth constant ($a_{24}$, $b_{24}$, $c_{24}$, $d_{24}$) are stored, in place of the first constant ($a_{11}$, $b_{11}$, $c_{11}$, $d_{11}$), in the storage 5 of the physical quantity sensor device of this embodiment illustrated in FIG.

1, before factory shipment. In a case of using the physical quantity sensor 10 of this embodiment, the temperature T is measured by the temperature sensor 1. Based on the result of comparing the measured temperature T less than the first boundary temperature $T_1$ with the second boundary temperature $T_2$, the operation processing unit 6 reads one of the third constant ($a_{23}$ $b_{23}$, $c_{23}$, $d_{23}$) and the fourth constant ($a_{24}$, $b_{24}$, $c_{24}$, $d_{24}$) from the storage 5. With this configuration, the operation processing unit 6 generates an approximate polynomial of the secondary frequency temperature characteristic of the expression (8) or (9). The temperature T is applied to this secondary frequency temperature characteristic so as to make it possible to calculate frequency fluctuation of the physical quantity sensor 10 due to temperature change.

Similarly, as illustrated in FIG. 12, the second region can be divided into a fifth region and a sixth region at the third boundary temperature $T_3$. Then, in order to obtain a fifth secondary frequency temperature characteristic approximated to the actual frequency temperature characteristic of the fifth region by, for example, the least squares method or the like, an approximate polynomial of the following expression (10) obtained by replacing the constant ($a_1$, $b_1$, $c_1$, $d_1$) of each term in the approximate polynomial of the expression (4) with a fifth constant ($a_{25}$, $b_{25}$, $c_{25}$, $d_{25}$) is used.

$$f_{25}(T) = a_{25} \times T_3 + b_{23} \times T_2 + c_{25} \times T + d_{25} \quad (10)$$

Similarly, in order to obtain a sixth secondary frequency temperature characteristic approximated to the actual frequency temperature characteristic of the sixth region by, for example, the least squares method or the like, an approximate polynomial of the following expression (11) obtained by replacing the constant ($a_1$, $b_1$, $c_1$, $d_1$) of each term in the approximate polynomial of the expression (4) with a sixth constant ($a_{26}$, $b_{26}$, $c_{26}$, $d_{26}$) is used.

$$f_{26}(T) = a_{26} \times T_3 + b_{26} \times T_2 + c_{26} \times T + d_{26} \quad (11)$$

Here, the fifth constant ($a_{25}$, $b_{25}$, $c_{25}$, $d_{25}$) is different from the sixth constant ($a_{26}$, $b_{26}$, $c_{26}$, $d_{26}$). In addition, each of the fifth constant ($a_{25}$, $b_{25}$, $c_{25}$, $d_{25}$) and the sixth constant ($a_{26}$, $b_{26}$, $c_{26}$, $d_{26}$) is also different from the constant ($a_1$, $b_1$, $c_1$, $d_1$), the first constant ($a_{21}$, $b_{21}$, $c_{21}$, $d_{21}$) and the second constant ($a_{22}$, $b_{22}$, $c_{22}$, $d_{22}$).

The fifth constant ($a_{25}$, $b_{25}$, $c_{25}$, $d_{25}$) and the sixth constant ($a_{26}$, $b_{26}$, $c_{26}$, $d_{26}$) are stored, in place of the second constant ($a_{22}$, $b_{22}$, $c_{22}$, $d_{22}$), in the storage 5 of the physical quantity sensor device of this embodiment illustrated in FIG. 1, before factory shipment. In a case of using the physical quantity sensor 10 of this embodiment, the temperature T is measured by the temperature sensor 1. Based on the result of comparing the measured temperature T greater than or equal to the first boundary temperature $T_1$ with the third boundary temperature $T_3$, the operation processing unit 6 reads one of the fifth constant ($a_{25}$, $b_{25}$, $c_{25}$, $d_{25}$) and the sixth constant ($a_{26}$, $b_{26}$, $c_{26}$, $d_{26}$) from the storage 5. With this configuration, the operation processing unit 6 generates an approximate polynomial of the secondary frequency temperature characteristic of the expression (9) or (10). The temperature T is applied to this secondary frequency temperature characteristic so as to make it possible to calculate frequency fluctuation of the physical quantity sensor 10 due to temperature change.

3.2. Utilization of High-Order Frequency Temperature Characteristic at and after Tertiary Order Among errors (errors between the actual frequency temperature characteristic and the first secondary frequency temperature characteristic) indicated by x marks after division correction illustrated in FIG. 8, an absolute value of an error at the temperature $T_2$ of the first region less than the first boundary temperature $T_1$ becomes the maximum. However, as the temperature $T_2$, a value at which the error indicated by the x mark after the division correction becomes the maximum value or the minimum value may be selected. Similarly, in FIG. 9, the error indicated by the x mark after division correction (error between the actual frequency temperature characteristic and the second secondary frequency temperature characteristic) also has the maximum absolute value of the error at the temperature $T_3$ (not illustrated in FIG. 6), which is equal to or higher than the first boundary temperature $T_1$, of the second region. Similarly, as the temperature $T_3$, a value at which the error indicated by the x mark after the division number correction becomes the maximum value or the minimum value may be selected.

In such a case, as illustrated in FIG. 12, the first region is divided into a third region and a fourth region at the second boundary temperature $T_2$. Then, in order to obtain a first tertiary frequency temperature characteristic at which the absolute value of the error (x mark in FIG. 8) between the actual frequency temperature characteristic and the first secondary frequency temperature characteristic becomes the minimum, in the third region, for example, by a least squares method or the like, an approximate polynomial of the following expression (12) obtained by replacing a constant ($a_1$, $b_1$, $c_1$, $d_1$) of each term in the approximate polynomial of the expression (4) with a third constant ($a_{31}$, $b_{31}$, $c_{31}$, $d_{31}$) is used.

$$f_{31}(T) = a_{31} \times T_3 + b_{31} \times T_2 + c_{31} \times T + d_{31} \quad (12)$$

Similarly, in order to obtain a second tertiary frequency temperature characteristic at which the absolute value of the error (x mark in FIG. 8) between the actual frequency temperature characteristic and the first secondary frequency temperature characteristic becomes the minimum, in the fourth region, for example, by a least squares method or the like, an approximate polynomial of the following expression (13) obtained by replacing a constant ($a_1$, $b_1$, $c_1$, $d_1$) of each term in the approximate polynomial of the expression (4) with a fourth constant ($a_{32}$, $b_{32}$, $c_{32}$, $d_{32}$) is used.

$$f_{32}(T) = a_{32} \times T_3 + b_{32} \times T_2 + c_{32} \times T + d_{32} \quad (13)$$

Here, the third constant ($a_{31}$, $b_{31}$, $c_{31}$, $d_{31}$) is different from the fourth constant ($a_{32}$, $b_{32}$, $c_{32}$, $d_{32}$). In addition, each of the third constant ($a_{31}$, $b_{31}$, $c_{31}$, $d_{31}$) and the fourth constant ($a_{32}$, $b_{32}$, $c_{32}$, $d_{32}$) is also different from the constant ($a_1$, $b_1$, $c_1$, $d_1$) the first constant ($a_{21}$, $b_{21}$, $c_{21}$, $d_{21}$) and the second constant ($a_{22}$, $b_{22}$, $c_{22}$, $d_{22}$).

The third constant ($a_{31}$, $b_{31}$, $c_{31}$, $d_{31}$) and the fourth constant ($a_{32}$, $b_{32}$, $c_{32}$, $d_{32}$) are stored, in place of the first constant ($a_{21}$, $b_{21}$, $c_{21}$, $d_{21}$), in the storage 5 of the physical quantity sensor device of this embodiment illustrated in FIG. 1, before factory shipment. In a case of using the physical quantity sensor 10 of this embodiment, the temperature T is measured by the temperature sensor 1. Based on the result of comparing the measured temperature T less than the first boundary temperature $T_1$ with the second boundary temperature 12, the operation processing unit 6 reads one of the third constant ($a_{31}$, $b_{31}$, $c_{31}$, $d_{31}$) and the fourth constant ($a_{32}$, $b_{32}$, $c_{32}$, $d_{32}$) from the storage 5. With this configuration, the operation processing unit 6 generates an approximate polynomial of the tertiary frequency temperature characteristic of the expression (12) or (13). The temperature T is applied to this tertiary frequency temperature characteristic so as to make it possible to calculate frequency fluctuation of the physical quantity sensor 10 due to temperature change.

Similarly, as illustrated in FIG. 12, the second region can be divided into a fifth region and a sixth region at the third boundary temperature $T_3$. Then, in order to obtain a third tertiary frequency temperature characteristic at which the absolute value of the error (x mark in FIG. 9) between the actual frequency temperature characteristic and the first secondary frequency temperature characteristic becomes the minimum, in the fifth region, for example, by a least squares method or the like, an approximate polynomial of the following expression (14) obtained by replacing a constant $(a_1, b_1, c_1, d_1)$ of each term in the approximate polynomial of the expression (4) with a fifth constant $(a_{33}, b_{33}, c_{33}, d_{33})$ is used.

$$f_{33}(T)=a_{33}\times T_3+b_{33}\times T_2+c_{33}\times T+d_{33} \quad (14)$$

Similarly, in order to obtain a fourth tertiary frequency temperature characteristic at which the absolute value of the error (x mark in FIG. 9) between the actual frequency temperature characteristic and the first secondary frequency temperature characteristic becomes the minimum, in the sixth region, for example, by a least squares method or the like, an approximate polynomial of the following expression (15) obtained by replacing a constant $(a_1, b_1, c_1, d_1)$ of each term in the approximate polynomial of the expression (4) with a sixth constant $(a_{34}, b_{34}, c_{34}, d_{34})$ is used.

$$f_{34}(T)=a_{34}\times T_3+b_{34}\times T_2+c_{34}\times T+d_{34} \quad (15)$$

Here, the fifth constant $(a_{33}, b_{33}, c_{33}, d_{33})$ is different from the sixth constant $(a_{34}, b_{34}, c_{34}, d_{34})$. In addition, each of the fifth constant $(a_{33}, b_{33}, c_{33}, d_{33})$ and the sixth constant $(a_{26}, b_{26}, c_{26}, d_{26})$ is also different from the constant $(a_1, b_1, c_1, d_1)$, the first constant $(a_{21}, b_{21}, c_{21}, d_{21})$, and the second constant $(a_{22}, b_{22}, c_{22}, d_{22})$.

The fifth constant $(a_{33}, b_{33}, c_{33}, d_{33})$ and the sixth constant $(a_{34}, b_{34}, c_{34}, d_{34})$ are stored, in place of the second constant $(a_{22}, b_{22}, c_{22}, d_{22})$, in the storage 5 of the physical quantity sensor device of this embodiment illustrated in FIG. 1, before factory shipment. In a case of using the physical quantity sensor 10 of this embodiment, the temperature T is measured by the temperature sensor 1. Based on the result of comparing the measured temperature T equal to or higher than the first boundary temperature $T_1$ with the third boundary temperature $T_3$, the operation processing unit 6 reads one of the fifth constant $(a_{25}, b_{25}, c_{25}, d_{25})$ and the sixth constant $(a_{34}, b_{34}, c_{34}, d_{34})$ from the storage 5. With this configuration, the operation processing unit 6 generates an approximate polynomial of the primary frequency temperature characteristic of the expression (13) or (14). The temperature T is applied to this primary frequency temperature characteristic so as to make it possible to calculate frequency fluctuation of the physical quantity sensor 10 due to temperature change. In this way, the error between the actual frequency temperature characteristic and the tertiary frequency temperature characteristic becomes smaller than ±1 ppm illustrated in FIGS. 8 to 10, and detection accuracy further improves.

4. Apparatus Using Physical Quantity Sensor Device

Hereinafter, an apparatus using the physical quantity sensor device having the configuration described above will be described with reference to FIGS. 13 to 20.

4.1. Inclinometer

Figure 13:
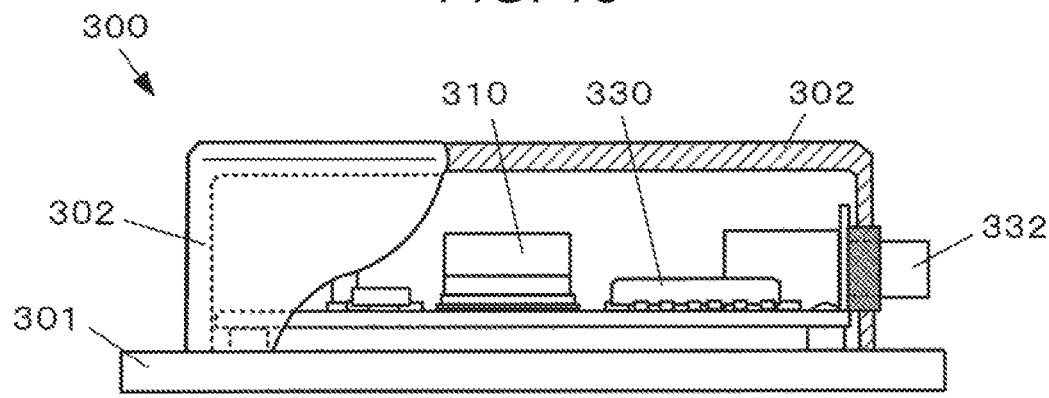
FIG. 13 is a diagram illustrating an inclinometer including the physical quantity sensor device.

FIG. 13 is a diagram illustrating a configuration example of the inclinometer, and is a side view illustrating a partial cross section.

An inclinometer 300 is a device that outputs a signal corresponding to an inclination angle of a position where the inclinometer 300 is installed. Specifically, the inclinometer 300 includes a physical quantity sensor device 310 having the structure of the physical quantity sensor device 200A (200B) of the first embodiment, a calculator 330 for calculating the inclination angle based on the output signal of the physical quantity sensor device 310, and an external output terminal 332 for outputting a signal according to the inclination angle calculated by the calculator 210 to the outside in an inner space defined by an under case 301 and an upper case 302. The inclinometer 300 may appropriately include other elements. For example, the inclinometer 300 may include a built-in battery, a power supply circuit, a wireless device, and the like.

The inclination calculator 330 is a circuit that computes the inclination angle from the output signal of the physical quantity sensor device 310 and outputs a signal corresponding to the inclination angle and can be realized by, for example, a general purpose integrated circuit (IC), a field programmable gate array (FPGA), or the like.

From the physical quantity sensor device 310, for example, accelerations in directions of the x-axis, y-axis, and z-axis which are orthogonal three axes are output. The inclinometer 300 measures inclination angles (angles between the x-axis, y-axis, and z-axis and the horizontal plane) of the x-axis, y-axis, and z-axis from accelerations in the x-axis, y-axis, and z-axis directions. For example, the inclinometer 300 may be mounted on the floor surface near the center of gravity of a ship so that the x-axis faces the bow direction of the ship, the y-axis faces the port side of the ship, and the z-axis faces the floor surface vertical direction.

Figure 14:
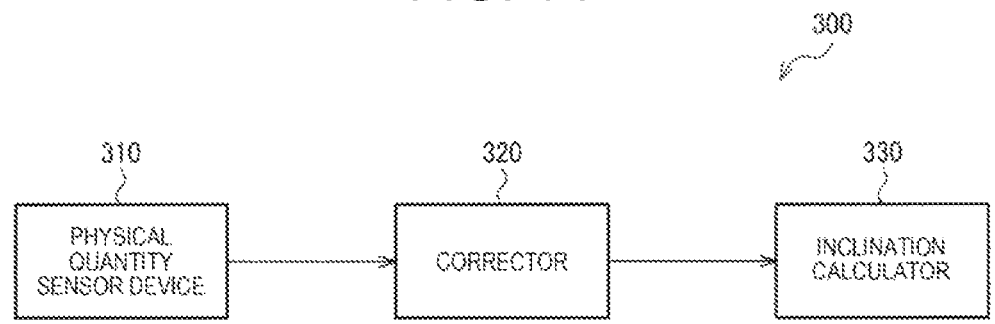
FIG. 14 is a block diagram of the inclinometer including the physical quantity sensor device.

As illustrated in FIG. 14, a corrector 320 can be included between the physical quantity sensor device 310 and the inclination calculator 330. The corrector 320 corrects accelerations in the x-axis, y-axis, and z-axis directions output from the physical quantity sensor device 310. For example, the corrector 320 performs alignment correction of accelerations in the x-axis, y-axis, and z-axis directions output from the physical quantity sensor device 310, offset correction, temperature drift correction, and the like. The corrector 320 may be omitted when the alignment of acceleration output from the physical quantity sensor device 310, the offset, the temperature drift, and the like are small.

The inclination calculator 330 (corresponding to the calculator of the invention) can calculate the inclination of each axis with respect to the horizontal plane based on the accelerations in the x-axis, y-axis, and z-axis directions corrected by the corrector 320.

Figure 15:
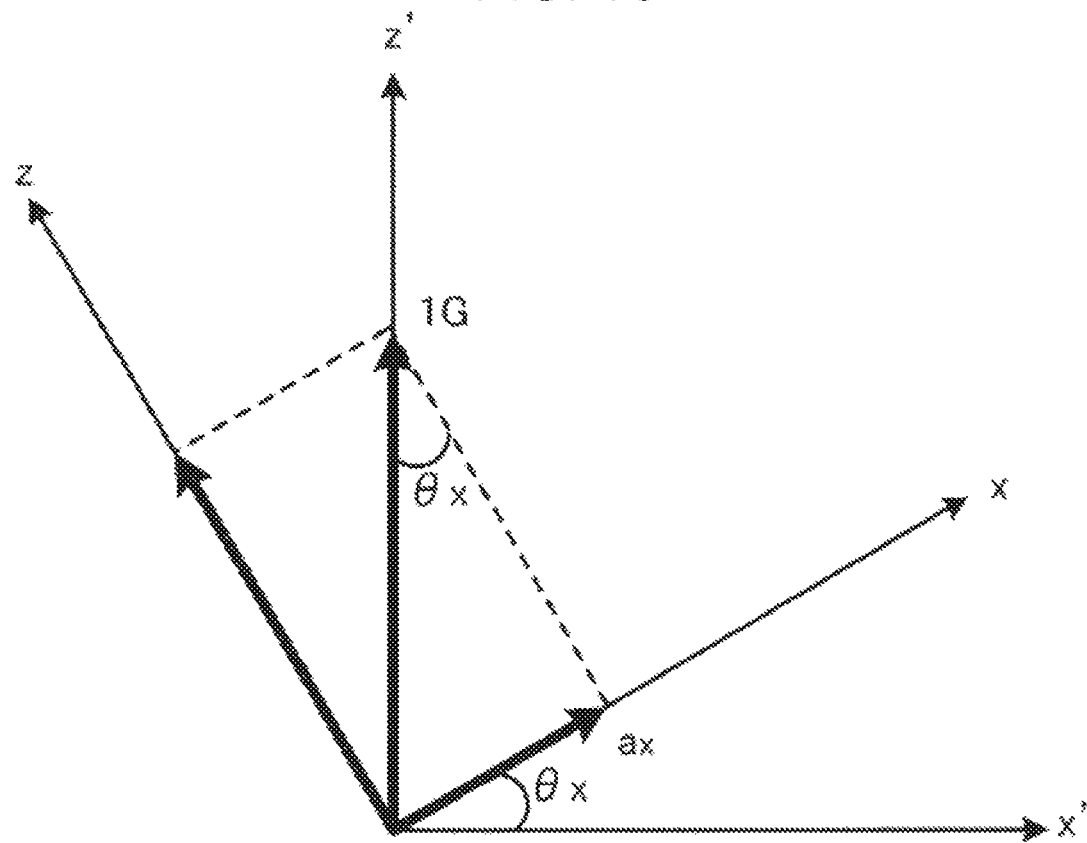
FIG. 15 is a view for explaining an example of calculation of an inclination angle.

FIG. 15 is a view for explaining a calculation example of the inclination angle. "x'" illustrated in FIG. 15 indicates an axis parallel to the horizontal direction, and "z'" indicates an axis parallel to the direction of gravity. "x" indicates the x-axis of the physical quantity sensor device 310. "Z" indicates the z-axis of the physical quantity sensor device 310. It is assumed that the "y-axis" of the physical quantity sensor device 310 faces the back side of the page. The direction of gravitational acceleration is upward in FIG. 15.

As illustrated in FIG. 15, the x-axis of the physical quantity sensor device 310 is assumed to be inclined at an angle "$\theta_x$" about the y-axis as a rotation axis. In this case, it is assumed that the acceleration (gravitational acceleration component) in the x-axis direction output from the acceleration sensor 11 is "$a_x$", the following expression (1) is established.

$$\sin\theta_x = \frac{a_x}{1G} \qquad (1)$$

"1G" expressed in the expression (1) is gravitational acceleration and "1G=9.80665 m/s²".

From the expression (1), inclination "$\theta_x$" with respect to the horizontal direction of the x-axis is expressed by the following expression (2).

$$\theta_x = \sin^{-1}\frac{a_x}{1G} \qquad (2)$$

Similarly, inclinations "$\theta_y$" and "$\theta_z$" with respect to the horizontal direction of the y-axis and z-axis are expressed by the following expressions (3) and (4).

$$\theta_y = \sin^{-1}\frac{a_y}{1G} \qquad (3)$$

$$\theta_z = \sin^{-1}\frac{a_z}{1G} \qquad (4)$$

"$a_y$" in the expression (3) is acceleration in the y-axis direction and "$a_z$" in the expression (4) is acceleration in the z-axis direction.

That is, the inclination calculator 330 calculates the inclination angles of the x-axis, y-axis, and z-axis with respect to the horizontal direction by performing computation expressed in the expressions (2) to (4) on the basis of the accelerations "$a_x$", "$a_y$", and "$a_z$" in the x-axis, y-axis, and z-axis directions output from the corrector 320 and the gravitational acceleration "1G".

The inclination calculator 330 may calculate the inclination angle of each axis using the gravitational acceleration (1G) set (stored) in the inclinometer 300 in advance. In this case, for a value of the gravitational acceleration which is set in the inclinometer 300, the latitude at which the inclinometer 300 is used may be taken into consideration.

The inclination calculator 330 may calculate gravitational acceleration from the acceleration output from the corrector 320. For example, the inclination calculator 330 can calculate the gravitational acceleration by "$(a_x^2+a_y^2+a_z^2)^{1/2}$".

4.2. Inertia Measurement Device

Figure 16:
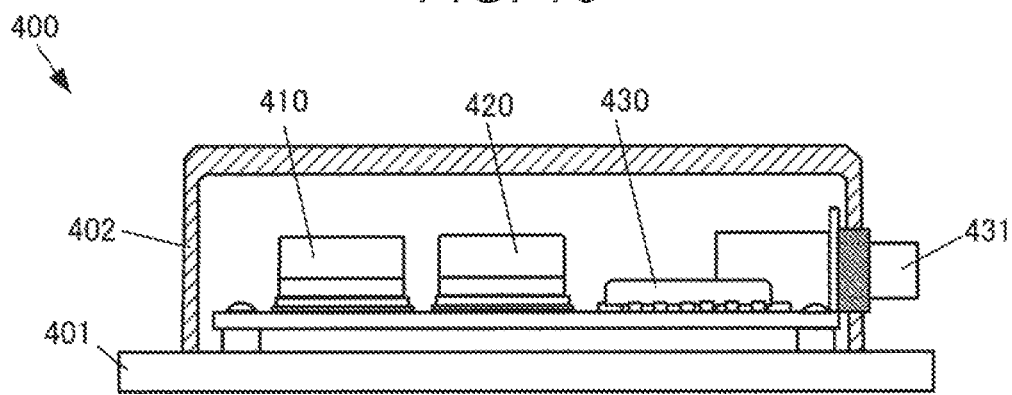
FIG. 16 is a diagram illustrating an inertia measurement device including the physical quantity sensor device.
Figure 17:
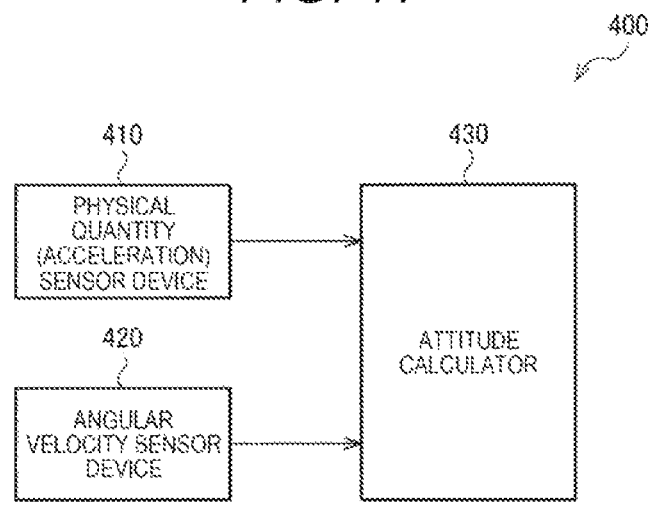
FIG. 17 is a block diagram of the inertia measurement device.

FIG. 16 is a diagram illustrating a configuration example of an inertia measurement device (IMU), and is a side view illustrating a partial cross section. FIG. 17 is a block diagram of the inertia measurement device. The inertia measurement device 400 is an inertia measurement device attached to a moving object, and includes a physical quantity sensor device 410 having the same structure as the physical quantity sensor device 200A (200 B) of the embodiment, an angular velocity sensor device 420, an attitude calculator (circuit) 430 that calculates an attitude of the moving object based on an acceleration signal of the physical quantity sensor device 410 and an angular velocity signal of the angular velocity sensor device 420, and an external output terminal 431 for outputting a signal corresponding to the attitude calculated by the circuit 430 to the outside, in the inner space defined by an under case 401 and an upper case 402. The inertia measurement device 400 may include, for example, a built-in battery, a power supply circuit, a wireless device, and the like.

The circuit 430 is realized by, for example, a general purpose integrated circuit (IC) or a field programmable gate array (FPGA), and calculates the attitude of the moving object to which the inertia measurement device 400 is attached from the acceleration signal of the physical quantity sensor device 410 and the angular velocity signal of the angular velocity sensor device 420, and outputs a signal corresponding to the attitude. The method of measuring the attitude of the moving object from the acceleration and the angular velocity is well known and will be omitted.

According to the inertia measurement device 400 of this embodiment, the physical quantity sensor device 410 uses the structure of the sensor device 200A (200B) of this embodiment. For that reason, since accuracy of the acceleration signal, which is the output of the physical quantity sensor device 410, is high, measurement accuracy of the attitude of the moving object can be improved as compared with the inertia measurement device of the related art.

4.3. Structure Monitoring Device

Figure 18:
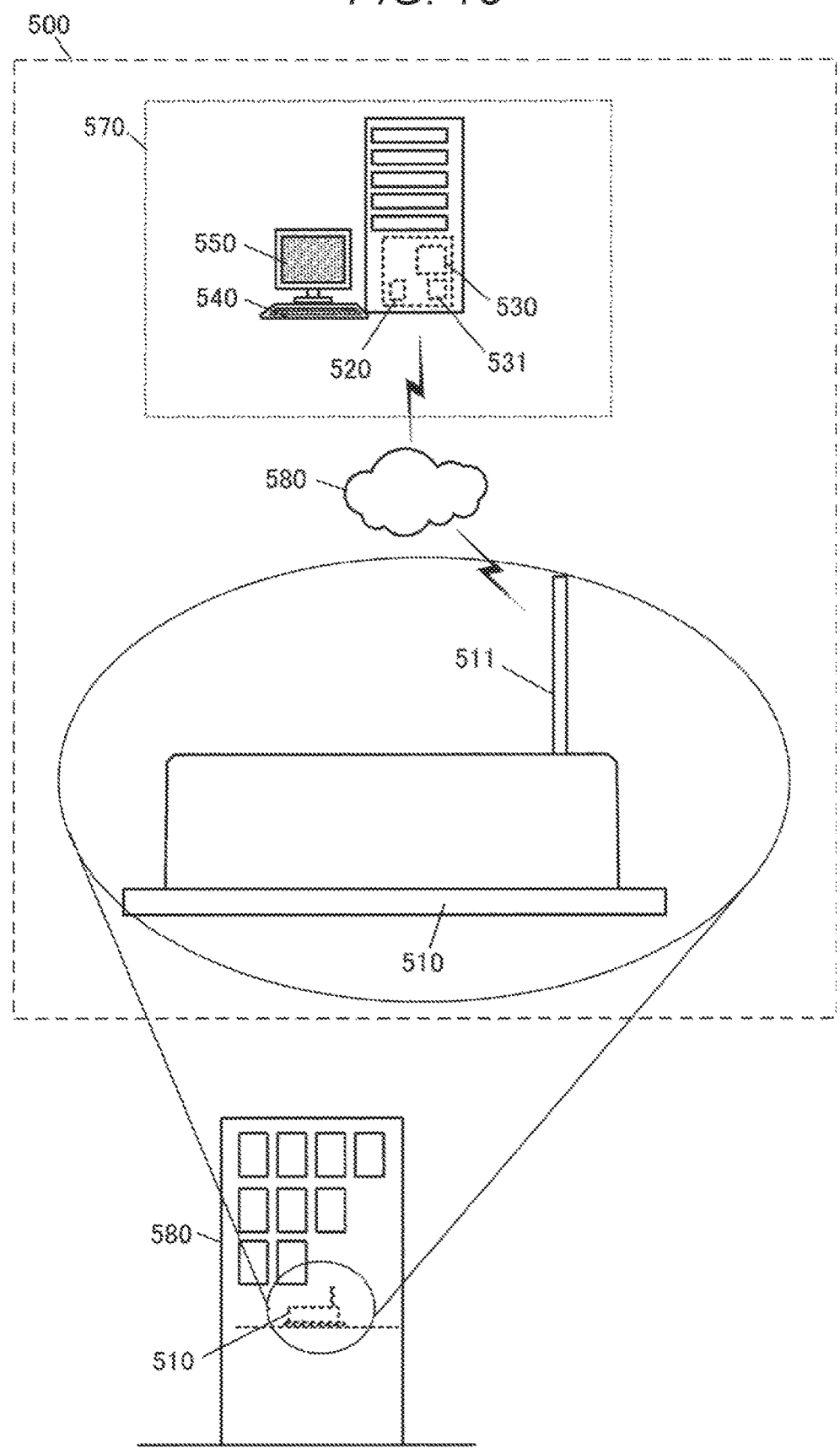
FIG. 18 is a diagram illustrating a structure monitoring device including the physical quantity sensor device.
Figure 19:
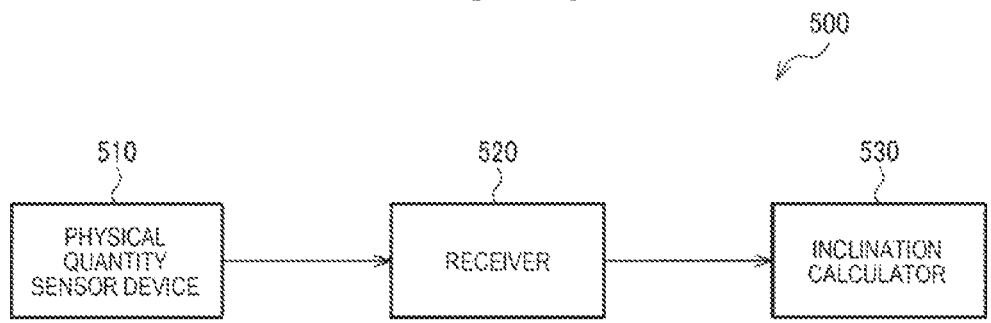
FIG. 19 is a block diagram of the structure monitoring device.

FIG. 18 illustrates a structure monitoring device (structural health monitoring: SHM) 500. The structure monitoring device 500 has the same structure as the physical quantity sensor device 200A (200B) of the embodiment and includes a physical quantity sensor device 510 attached to a structure 590 to be monitored. The physical quantity sensor device 510 includes a transmitter 511 that transmits a detection signal. The transmitter 511 may be realized as a communication module and an antenna separate from the physical quantity sensor device 510.

The physical quantity sensor device 510 is connected to, for example, a monitoring computer 570 through a wireless or priority communication network 580. The monitoring computer 570 includes a receiver 520 connected to the physical quantity sensor device 510 through the communication network 580 and an inclination calculator 530 for calculating an inclination angle of a structure 590 based on a reception signal of the receiver 520 (see also FIG. 19).

In this embodiment, the inclination calculator 530 is realized by an application specific integrated circuit (ASIC), a field programmable gate array (FPGA) or the like mounted on the monitoring computer 570. However, a configuration in which the inclination calculator 530 is realized by software by performing operation processing on a program stored in an IC memory 531 by a processor such as a central processing unit (CPU) may be adopted. The monitoring computer 570 can receive various operation inputs of the operator through a keyboard 540 and display the result of operation processing on a touch panel 550.

According to the structure monitoring device 500 of this embodiment, inclination of the structure 590 is monitored using the physical quantity sensor device 200A (200B) of this embodiment. For that reason, it is possible to utilize detection of highly accurate acceleration which is an operation effect of the physical quantity sensor device 200A (200B), it is possible to accurately detect the inclination of the structure 590 to be monitored, and it is possible to improve monitoring quality of the structure 590.

4.4. Moving Object

Figure 20:
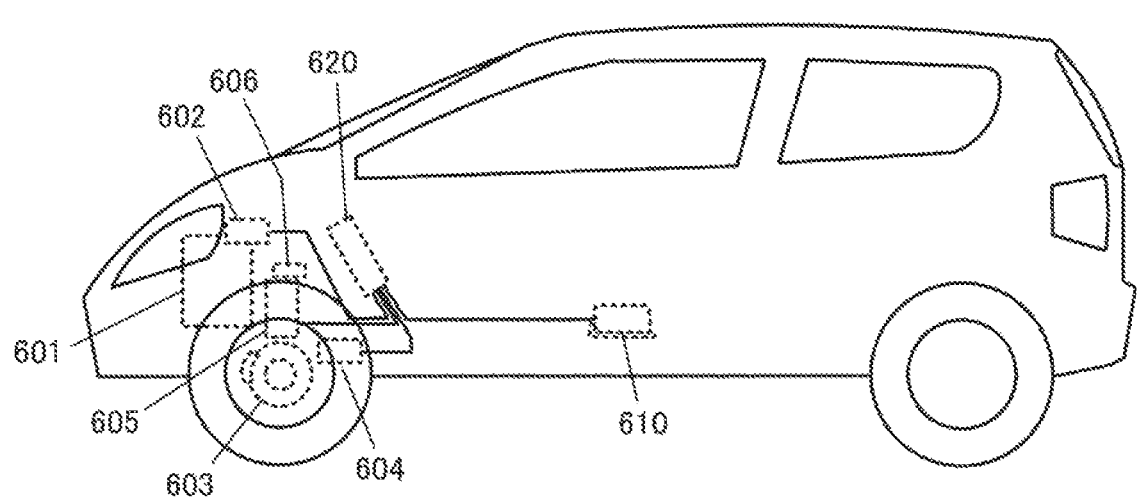
FIG. 20 is a diagram illustrating a moving object including the physical quantity sensor device.

FIG. 20 is a diagram illustrating a configuration example of a moving object. In this embodiment, a moving object 600 is exemplified as a passenger car, but a vehicle type can be appropriately changed. In addition, the moving object 600 may be a small boat, an automatic transporting device, an in-yard transporting vehicle, a forklift, or the like.

The moving object 600 includes a physical quantity sensor device 610 having the same structure as that of the physical quantity sensor device 200A (200B) of the embodiment and an automatic operation controller (controller) 620 for controlling at least one of acceleration, braking, and steering based on an acceleration signal of the physical quantity sensor device 610, and can switch execution or non-execution of the automatic operation based on the detection signal of the physical quantity sensor device 610.

The controller 620 is realized by an in-vehicle computer. The controller 620 is connected to various sensors and controllers such as the physical quantity sensor device 610, a throttle controller 503, a brake controller 505, a steering controller 507, and the like through a communication network such as an in-vehicle local area network (LAN) so that signals can be transmitted and received to and from the controller 620 and the sensors and controllers and vice versa. Here, a throttle controller 602 is a device that controls output of an engine 601. A brake controller 604 is a device that controls the operation of a brake 603. A steering controller 606 is a device that controls the operation of a power steering 605. The types of sensors and controllers connected to the controller 620 are not limited to these, and can be appropriately set.

Then, the controller 620 is a built-in operation device, and performs operation processing based on, for example, the acceleration detection signal of the physical quantity sensor device 610 to determine whether the automatic operation is to be executed or not. In a case where the automatic operation is to be executed, the controller 620 transmits a control command signal to at least one of the throttle controller 602, the brake controller 604, and the steering controller 606, and controls at least one of acceleration, braking, and steering.

The contents of the automatic control can be set appropriately. For example, in a case where acceleration measured by the physical quantity sensor device 610 reaches a threshold value that is considered to cause spin or corner-out during cornering, control may be performed to prevent spin or corner-out. In a case where the acceleration measured by the physical quantity sensor device 610 reaches a threshold value which is considered to have a possibility that a sudden forward or backward movement occurs due to an erroneous operation during stop, control may be performed such that the throttle is forcibly fully closed and sudden braking is forcibly activated.

An advanced driver assistance systems (ADAS) locator used for the automatically operated moving object 600 illustrated in FIG. 20 includes, in addition to an inertial sensor including the physical quantity sensor device 610, a global navigation satellite system (GNSS) receiver, and a map database storing map data. The ADAS locator measures a traveling position of the moving object in real time by combining a positioning signal received by the GNSS receiver and a measurement result of the inertial sensor. The ADAS locator reads the map data from the map database. An output from the ADAS locator including the physical quantity sensor device 610 is input to the automatic operation controller 620. The automatic operation controller 620 controls at least one of acceleration, braking, and steering of the moving object 600 based on the output (including a detection signal from the physical quantity sensor device 610) from the ADAS locator.

Figure 21:
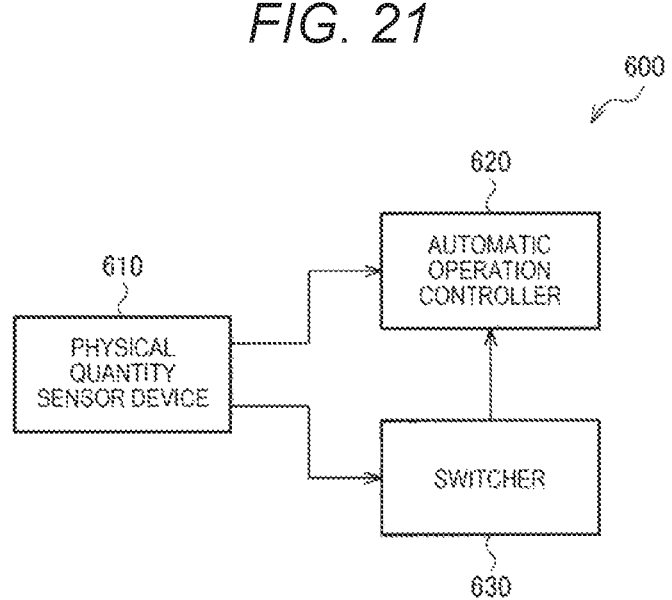
FIG. 21 is a block diagram of the moving object.

FIG. 21 is a block diagram illustrating a system related to the moving object 600. A switcher 630 switches execution or non-execution of the automatic operation in the automatic operation controller 620 based on change in the output (including change in the detection signal from the physical quantity sensor device 610) from the ADAS locator. The switcher 630 outputs a signal for switching from execution of the automatic operation to non-execution of the automatic operation to the controller 620, for example, in a case of abnormality in which detection capability of the sensor (including the physical quantity sensor device 610) in the ADAS locator is deteriorated.

The global navigation satellite system (GNSS) described above may use a global positioning system (GPS) as a satellite positioning system, for example. Alternatively, one or more of the satellite positioning systems such as a European geostationary-satellite navigation overlay service (EGNOS), a quasi zenith satellite system (QZSS), a global navigation satellite system (GLONASS), GALILEO, a BeiDou navigation satellite system (BeiDou) may be used. A stationary satellite type satellite-based augmentation system (SBAS) such as a wide area augmentation system (WAAS) and a European geostationary-satellite navigation overlay service (EGNOS) may be used for at least one of the satellite positioning systems.

The global navigation satellite system (GNSS) described above may use a global positioning system (GPS) as a satellite positioning system, for example. Alternatively, one or more of the satellite positioning systems such as a European geostationary-satellite navigation overlay service (EGNOS), a quasi zenith satellite system (QZSS), a global navigation satellite system (GLONASS), GALILEO, a BeiDou navigation satellite system (BeiDou) may be used. A stationary satellite type satellite-based augmentation system (SBAS) such as a wide area augmentation system (WAAS) and a European geostationary-satellite navigation overlay service (EGNOS) may be used for at least one of the satellite positioning systems.

Although this embodiment has been described in detail as above, it will be easily understood by those skilled in the art that many modifications are possible that do not deviate practically from novel matters and effects of the invention. Accordingly, all such modifications are included in the scope of the invention. For example, in the specification or the drawings, at least once, a term described together with a different term which is a broader or equivalent term can be replaced with the different term at any point in the specification or the drawings. Also, all combinations of this embodiment and modification examples are included in the scope of the invention.

The entire disclosure of Japanese Patent Application No. 2018-043534, filed Mar. 9, 2018 is expressly incorporated by reference herein.

What is claimed is:
1. A physical quantity sensor device comprising:
   a physical quantity sensor; and
   a storage,
   wherein the storage stores,
   when a temperature at which an absolute value of an error between an actual frequency temperature characteristic measured by using the physical quantity sensor and a primary frequency temperature characteristic approximated to the actual frequency temperature characteristic over an entire operating temperature range by a single approximate polynomial using a predetermined constant becomes a maximum value is set as a first boundary temperature,
   a first constant used as a constant of each term in the approximate polynomial to obtain a first secondary frequency temperature characteristic approximated to the actual frequency temperature characteristic, in a first temperature region less than the first boundary temperature, and a second constant used as a constant of each term in the approximate polynomial to obtain a second secondary frequency temperature characteristic approximated to the actual frequency temperature characteristic, in a second temperature region equal to or greater than the first boundary temperature.

2. The physical quantity sensor device according to claim 1,
wherein the maximum value is actual data obtained for a plurality of temperatures in the entire operating temperature range of any one of the actual frequency temperature characteristics created based on the actual data.

3. The physical quantity sensor device according to claim 1,
wherein the maximum value is a value interpolated between two pieces of actual data among the actual frequency temperature characteristics created based on actual data obtained for a plurality of temperatures in the entire operation temperature range.

4. The physical quantity sensor device according to claim 1,
wherein the storage stores, instead of the first constant,
when a temperature at which the error between the actual frequency temperature characteristic and the primary frequency temperature characteristic becomes a maximum value or a minimum value is set as a second boundary temperature in the first temperature region,
a third constant used as a constant of each term in the approximate polynomial to obtain a third secondary frequency temperature characteristic approximated to the actual frequency temperature characteristic, in a third temperature region less than the second boundary temperature, and
a fourth constant used as a constant of each term in the approximate polynomial to obtain a fourth secondary frequency temperature characteristic approximated to the actual frequency temperature characteristic, in a fourth temperature region equal to or greater than the second boundary temperature and less than the first boundary temperature.

5. The physical quantity sensor device according to claim 1,
wherein the storage stores, instead of the second constant,
when a temperature at which the error between the actual frequency temperature characteristic and the primary frequency temperature characteristic becomes a maximum value or a minimum value is set as a third boundary temperature in the second temperature region,
a fifth constant used as a constant of each term in the approximate polynomial to obtain a fifth secondary frequency temperature characteristic approximated to the actual frequency temperature characteristic, in a fifth temperature region equal to or greater than the first boundary temperature and less than the third boundary temperature, and
a sixth constant used as a constant of each term in the approximate polynomial to obtain a sixth secondary frequency temperature characteristic approximated to the actual frequency temperature characteristic, in a sixth temperature region equal to or greater than the third boundary temperature.

6. The physical quantity sensor device according to claim 1,
wherein the actual frequency temperature characteristic includes a dip in which the frequency locally decreases at the first boundary temperature.

7. The physical quantity sensor device according to claim 5,
wherein the actual frequency temperature characteristic includes a first dip locally decreasing at the first boundary temperature, and
a second dip locally decreasing at the second boundary temperature or the third boundary temperature.

8. The physical quantity sensor device according to claim 1,
wherein the storage stores, instead of the first constant,
when a temperature at which the error between the actual frequency temperature characteristic and the first secondary frequency temperature characteristic becomes a maximum value or a minimum value is set as a second boundary temperature in the first temperature region,
a third constant used as a constant of each term in the approximate polynomial to obtain a first tertiary frequency temperature characteristic that minimizes an absolute value of the error between the actual frequency temperature characteristic and the first secondary frequency temperature characteristic in a third temperature region less than the second boundary temperature, and
a fourth constant used as a constant of each term in the approximate polynomial to obtain a second tertiary frequency temperature characteristic that minimizes an absolute value of the error between the actual frequency temperature characteristic and the second secondary frequency temperature characteristic in a fourth temperature region equal to or greater than the second boundary temperature and less than the first boundary temperature.

9. The physical quantity sensor device according to claim 1,
wherein the storage stores, instead of the second constant,
when a temperature at which the error between the actual frequency temperature characteristic and the second secondary frequency temperature characteristic becomes a maximum value or a minimum value is set as a third boundary temperature in the second temperature region,
a fifth constant used as a constant of each term in the approximate polynomial to obtain a third tertiary frequency temperature characteristic that minimizes an absolute value of the error between the actual frequency temperature characteristic and the second secondary frequency temperature characteristic in a fifth temperature region equal to or greater than the first boundary temperature and less than the third boundary temperature, and
a sixth constant used as a constant of each term in the approximate polynomial to obtain a fourth tertiary frequency temperature characteristic that minimizes an absolute value of the error between the actual frequency temperature characteristic and the second secondary frequency temperature characteristic in a sixth temperature region equal to or greater than the third boundary temperature.

10. The physical quantity sensor device according to claim 1,
wherein the first constant and the second constant differ from each other in at least one of (N+1) constants when the single approximate polynomial is an N-th order polynomial (N is an integer of 2 or more).

11. The physical quantity sensor device according to claim 1,
further comprising a circuit board is provided,
wherein three physical quantity sensors are provided, and
the three physical quantity sensors may be mounted on the circuit board so that each of detection axes of the three physical quantity sensors is aligned with each of three axes orthogonal to each other.

12. The physical quantity sensor device according to claim 1,
wherein the physical quantity sensor includes
a base,
a movable portion,
a constricted portion that is disposed between the base and the movable portion and connects the base and the movable portion, and
a physical quantity detection element that has a resonance frequency that changes according to stress, is disposed across the constricted portion in a plan view, and is attached to the base and the movable portion.

13. The physical quantity sensor device according to claim 1,
wherein the physical quantity is acceleration.

14. An inclinometer comprising:
the physical quantity sensor device according to claim 13; and
a calculator that calculates an inclination angle of a structure based on an output signal from the physical quantity sensor device attached to the structure.

15. An inertia measurement device comprising:
the physical quantity sensor device according to claim 13;
an angular velocity sensor device; and
a circuit for calculating an attitude of a moving object based on an acceleration signal from the physical quantity sensor device and an angular velocity signal from the angular velocity sensor device.

16. A structure monitoring device comprising:
the physical quantity sensor device according to claim 13;
a receiver that receives a detection signal from the physical quantity sensor device attached to a structure; and
a calculator that calculates an inclination angle of the structure based on a signal output from the receiver.

17. A moving object comprising:
the physical quantity sensor device according to claim 13; and
a controller that controls at least one of acceleration, braking, and steering based on a detection signal detected by the physical quantity sensor device,
wherein execution or non-execution of an automatic operation is switched according to a change in a detection signal from the physical quantity sensor device.

* * * * *